(12) United States Patent
Nam

(10) Patent No.: US 11,064,298 B2
(45) Date of Patent: Jul. 13, 2021

(54) DISPLAY APPARATUS

(71) Applicant: LG Display Co., Ltd., Seoul (KR)

(72) Inventor: Yoonmo Nam, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/590,818

(22) Filed: Oct. 2, 2019

(65) Prior Publication Data
US 2020/0128330 A1  Apr. 23, 2020

(30) Foreign Application Priority Data
Oct. 23, 2018 (KR) .................. 10-2018-0126763

(51) Int. Cl.
*H04R 7/04* (2006.01)
*H04R 1/02* (2006.01)
*H04R 9/06* (2006.01)
*H04R 9/02* (2006.01)
*H05K 5/00* (2006.01)

(52) U.S. Cl.
CPC ............. *H04R 7/045* (2013.01); *H04R 1/028* (2013.01); *H04R 9/025* (2013.01); *H04R 9/06* (2013.01); *H04R 2499/15* (2013.01); *H05K 5/0017* (2013.01)

(58) Field of Classification Search
CPC combination set(s) only.
See application file for complete search history.

(56) References Cited

U.S. PATENT DOCUMENTS

| | | |
|---|---|---|
| 7,657,042 B2 | 2/2010 | Miyata |
| 2006/0191742 A1 | 8/2006 | Inagaki et al. |
| 2017/0280246 A1 * | 9/2017 | Choi ................. H04R 9/06 |
| 2019/0028787 A1 * | 1/2019 | Masuda .............. H04R 7/26 |
| 2019/0200111 A1 * | 6/2019 | Kang ................. H04R 1/028 |

FOREIGN PATENT DOCUMENTS

| | | |
|---|---|---|
| CN | 204539435 U | 8/2015 |
| CN | 205123966 U | 3/2016 |
| CN | 108124224 A | 6/2018 |
| EP | 3 331 251 A1 | 6/2018 |
| KR | 10-2005-0057111 A | 6/2005 |
| WO | 2018/123310 A1 | 7/2018 |

OTHER PUBLICATIONS

First Notification of Office Action dated Sep. 28, 2020, issued in corresponding Chinese Patent Application No. 201910972205.9.

* cited by examiner

*Primary Examiner* — Fan S Tsang
*Assistant Examiner* — Angelica M McKinney
(74) *Attorney, Agent, or Firm* — Morgan, Lewis & Bockius LLP

(57) ABSTRACT

A display apparatus includes a display panel configured to display an image, a supporting member on a rear surface of the display panel, the supporting member being configured to support the display panel, at least one sound generating device on the rear surface of the display panel, the at least one sound generating device being configured to vibrate the display panel to generate sound, a partition between the display panel and the supporting member, the partition including a first side and a second side vertical to the first side, a first pad in the first side, and a second pad in a side facing the first side, the second pad including a material differing from a material of the partition.

20 Claims, 20 Drawing Sheets

DISPLAY APPARATUS

CROSS-REFERENCE TO RELATED APPLICATIONS

This application claims the benefit of and priority to Korean Patent Application No. 10-2018-0126763, filed on Oct. 23, 2018, the entirety of which is hereby incorporated by reference.

BACKGROUND

Technical Field

The present disclosure relates to a display apparatus, and more particularly, to a display apparatus that vibrates a display panel to generate sound.

Discussion of the Related Art

Recently, as society advances toward an information-oriented society, the field of display apparatuses for visually displaying an electrical information signal has rapidly advanced. Consequently, various display apparatuses having excellent performance, such as thinness, weight-lightness, and low power consumption are being developed.

Examples of the display apparatuses may include liquid crystal display (LCD) apparatuses, field emission display (FED) apparatuses, organic light emitting display apparatuses, light emitting diode display apparatuses, quantum dot light emitting display apparatuses, and micro light emitting diode display apparatuses.

The LCD apparatuses each include an array substrate including a thin film transistor (TFT), an upper substrate including a color filter and/or a black matrix, and a liquid crystal layer between the array substrate and the upper substrate. The LCD apparatuses are apparatuses where an alignment state of the liquid crystal layer is adjusted with an electric field generated between two electrodes in a pixel area, and a transmittance of light is adjusted based on the alignment state, thereby displaying an image.

The organic light emitting display apparatuses, self-emitting devices, have low power consumption, a fast response time, high emission efficiency, excellent luminance, and a wide viewing angle.

Display apparatuses may each include a display panel which displays an image and a sound device which outputs sound along with an image. In the display apparatuses, a sound generated by the sound device travels to a rear surface of the display panel or a region under the display panel, instead of a front surface of the display panel. Therefore, sound quality is degraded due to interference of a sound reflected from a wall or a floor. For this reason, it is difficult to provide a clear sound from the sound device without hindering an immersion experience of a user.

Moreover, when a speaker included in a set apparatus such as a television (TV), a computer monitor, a notebook computer, or a desktop personal computer (PC) is provided, the speaker occupies a certain space. Thus, the design and space disposition of the set apparatus are limited.

SUMMARY

Accordingly, embodiments of the present disclosure are directed to a display apparatus that substantially obviates one or more of the issues due to limitations and disadvantages of the related art.

Therefore, the inventors have recognized the above-described problems and have performed various experiments so that, when viewing an image in front of a display panel, a traveling direction of a sound becomes a direction toward a front surface of the display panel, and thus, sound quality is enhanced. Through the various experiments, the inventors have invented a display apparatus having a new structure that outputs a sound having a traveling direction that is a direction toward a front surface of a display panel, thereby enhancing sound quality.

An aspect of the present disclosure is to provide a display apparatus including a sound generating device for generating a sound which travels to a region in front of a display panel.

Another aspect of the present disclosure is to provide a sound generating device having a new structure, which decreases a wave phenomenon of a display panel.

Additional features and aspects of the disclosure will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other advantages of the inventive concepts as embodied and broadly described, a display apparatus comprises a display panel configured to display an image, a supporting member on a rear surface of the display panel, the supporting member being configured to support the display panel, at least one sound generating device on the rear surface of the display panel, the at least one sound generating device being configured to vibrate the display panel to generate sound, a partition between the display panel and the supporting member, the partition including a first side and a second side vertical to the first side, a first pad in the first side, and a second pad in a side facing the first side, the second pad including a material differing from a material of the partition.

In another aspect, a display apparatus comprises a display panel configured to display an image and including a first region, a second region, and a third region, at least one sound generating device in at least one of the first region, the second region, and the third region on the rear surface of the display panel, a supporting member on a rear surface of the display panel, the supporting member being configured to support the display panel, a first partition between the display panel and the supporting member, the partition including a first side and a second side vertical to the first side, at least one first pad in the first region, the at least one first pad being in the first side, and at least one second pad facing the at least one first pad, the at least one second pad including a material differing from a material of the first partition.

Since the display apparatus according to an embodiment of the present disclosure includes the sound generating device which vibrates the display panel to generate a sound, the sound of the display apparatus may be output to a region in front of the display panel. Accordingly, an immersion experience of a viewer who is watching an image displayed by the display apparatus is enhanced.

Moreover, since the display apparatus according to an embodiment of the present disclosure includes the sound generating device which vibrates the display panel to generate a sound, a speaker may not be provided, and thus, a degree of freedom in design and element disposition of a set apparatus is enhanced.

Moreover, in the display apparatus according to an embodiment of the present disclosure, a partition and at least one pad disposed on at least one side of the partition may be provided, and thus, peak and dipping each caused by a standing wave may be reduced, thereby enhancing a sound output characteristic.

Moreover, according to an embodiment of the present disclosure, since the partition is provided between one or more sound generating devices disposed on the display panel, the partition may separate sounds, thereby providing a display apparatus which realizes a stereo sound and has an enhanced sound output characteristic.

Moreover, in the display apparatus according to an embodiment of the present disclosure, the partition and at least one pad disposed on at least one side of the partition may be provided, and the partition and the pad may include different materials, thereby decreasing a wave phenomenon of the display panel.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are examples and explanatory and are intended to provide further explanation of the disclosure as claimed.

BRIEF DESCRIPTION OF THE DRAWING

The accompanying drawings, that may be included to provide a further understanding of the disclosure and are incorporated in and constitute a part of this application, illustrate embodiments of the disclosure and together with the description serve to explain various principles of the disclosure.

Figure 1A:
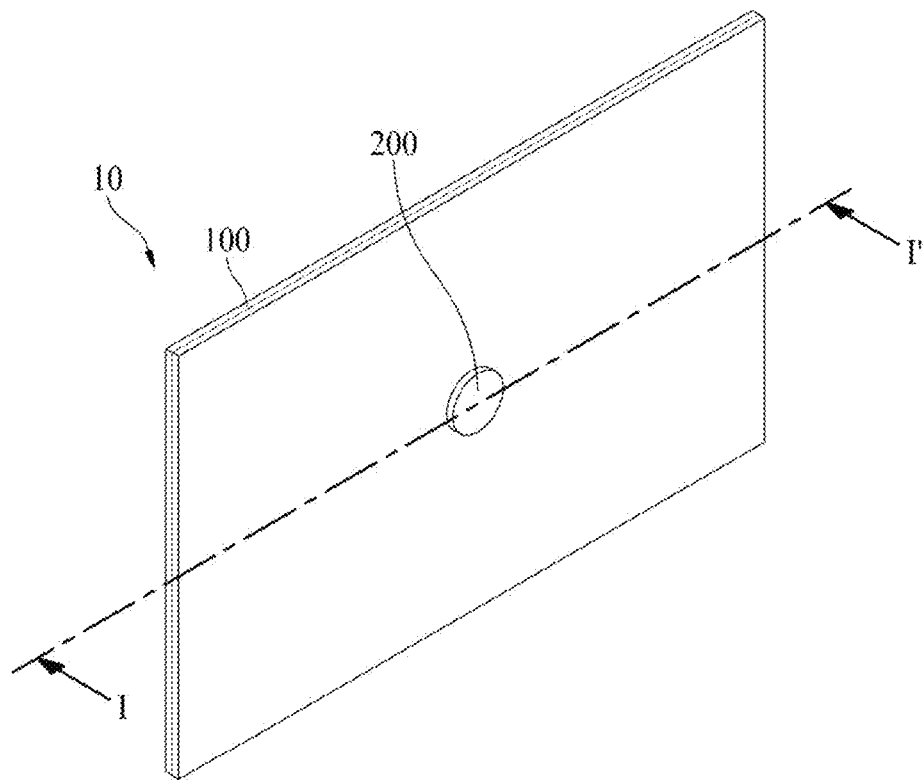
FIG. 1A illustrates a display apparatus including a sound generating device according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which are illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example. Thus, the present disclosure is not limited to the illustrated details. Like reference numerals refer to like elements throughout. In the following description, when the detailed description of the relevant known function or configuration is determined to unnecessarily obscure the important point of the present disclosure, the detailed description of such known function or configuration may be omitted. When terms "comprise," "have," and "include" described in the present specification are used, another part may be added unless a more limiting term, such as "only," is used. The terms of a singular form may include plural forms unless referred to the contrary.

In construing an element, the element is construed as including an error or tolerance range range even where no explicit description of such an error or tolerance range.

In describing a position relationship, when a position relation between two parts is described as, for example, "on," "over," "under," or "next," one or more other parts may be disposed between the two parts unless a more limiting term, such as "just" or "direct(ly)" is used. In describing a time relationship, when the temporal order is described as, for example, "after," "subsequent," "next," or "before," a case that is not continuous may be included, unless a more limiting term, such as "just," "immediate(ly)," or "direct(ly)," is used In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, terms such as "first," "second," "A," "B," "(a)," "(b)," may be used. These terms are intended to identify the corresponding elements from the other elements, and basis, order, or number of the corresponding elements should not limited by these terms. The expression that an element is "connected," "coupled," or "adhered" to another element or layer the element or layer can not only be directly connected or adhered to another element or layer, but also be indirectly connected or adhered to another element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term "part" or "unit" may apply, for example, to a separate circuit or structure, an integrated circuit, a computational block of a circuit device, or any structure configured to perform a described function as should be understood to one of ordinary skill in the art.

In the present disclosure, examples of a display apparatus may include a narrow-sense display apparatus such as an organic light emitting display (OLED) module or a liquid crystal module (LCM) including a display panel and a driver for driving the display panel. Also, examples of the display apparatus may include a set device (or a set apparatus) or a set electronic device such as a notebook computer, a TV, a computer monitor, an equipment apparatus including an automotive apparatus or another type apparatuses for vehicles, or a mobile electronic device such as a smartphone or an electronic pad, which is a complete product (or a final product) including an LCM or an OLED module.

Therefore, in the present disclosure, examples of the display apparatus may include a narrow-sense display apparatus itself, such as an LCM or an OLED module, and a set device which is a final consumer device or an application product including the LCM or the OLED module.

In some embodiments, an LCM or an OLED module including a display panel and a driver may be referred to as a narrow-sense display apparatus, and an electronic device which is a final product including an LCM or an OLED module may be referred to as a set apparatus. For example, the narrow-sense display apparatus may include a display panel, such as an LCD or an OLED, and a source printed circuit board (PCB) which is a controller for driving the display panel. The set apparatus may further include a set PCB which is a set controller electrically connected to the source PCB to overall control the set apparatus.

A display panel applied to an embodiment of the present disclosure may use any type of display panel, such as a liquid crystal display panel, an organic light emitting diode (OLED) display panel, and an electroluminescent display panel, but is not limited to a specific display panel which is vibrated by a sound generation device according to an embodiment of the present disclosure to output sound. Also, a shape or a size of a display panel applied to a display apparatus according to an embodiment of the present disclosure is not limited.

For example, if the display panel is the liquid crystal display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT) which is a switching element for adjusting a light transmittance of each of the plurality of pixels, an upper substrate including a color filter and/or a black matrix, and a liquid crystal layer between the array substrate and the upper substrate.

Moreover, if the display panel is the organic light emitting display panel, the display panel may include a plurality of gate lines, a plurality of data lines, and a plurality of pixels respectively in a plurality of pixel areas defined by intersections of the gate lines and the data lines. Also, the display panel may include an array substrate including a TFT which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot, or the like). As another example, the layer provided on the array substrate may include a micro light emitting diode.

The display panel may further include a backing such as a metal plate attached on the display panel. However, embodiments are not limited to the metal plate, and the display panel may include another structure.

In the present disclosure, the display panel may be applied to vehicles as a user interface module such as a central control panel for automobiles. For example, the display panel may be provided between occupants sitting on two front seats in order for a vibration of the display panel to be transferred to the inside of a vehicle. Therefore, an audio experience in a vehicle is improved in comparison with a case where speakers are disposed on interior sides of the vehicle.

Hereinafter, embodiments of the present disclosure will be described in detail with reference to the accompanying drawings. In the following description, when the detailed description of the relevant known function or configuration is determined to unnecessarily obscure the present disclosure, the detailed description may be omitted. Also, for convenience of description, a scale of each of elements illustrated in the accompanying drawings differs from a real scale, and thus, is not limited to a scale illustrated in the drawings.

FIG. 1A illustrates a display apparatus including a sound generating device according to an embodiment of the present disclosure.

FIG. 1A illustrates a rear surface of a display apparatus 10. With reference to FIG. 1A, the display apparatus 10 may include a display panel 100, which may display an image, and a sound generating device 200 which is disposed on a rear surface of the display panel 100 and vibrates the display panel 100 to generate a sound. For example, the sound generating device 200 may directly vibrate the display panel 100 to output sound to a forward region in front of the display panel 100.

The display panel 100 may display an image (for example, an electronic image or a digital image), and may be configured as any type of display panel such as a liquid crystal display panel, an organic light emitting diode (OLED) display panel, an electroluminescent display panel, etc. The display panel 100 may vibrate based on a vibration of the sound generating device 200 to output a sound.

According to an embodiment of the present disclosure, the display panel 100 may display an image in a type such as a top emission type, a bottom emission type, or a dual emission type, based on a structure of a pixel array layer including an anode electrode, a cathode electrode, and an organic compound layer. In the top emission type, visible light emitted from the pixel array layer may be irradiated onto a region in front of a base substrate to allow an image to be displayed. In the bottom emission type, the visible light emitted from the pixel array layer may be irradiated onto a rearward region behind the base substrate to allow an image to be displayed.

Moreover, the sound generating device 200 may generate sound using the display panel 100 as a vibration plate. The sound generating device 200 may be referred to as an "actuator," an "exciter," or a "transducer," but is not limited thereto. For example, the sound generating device 200 may be a sound device for outputting sound according to an electrical signal.

Figure 1B:
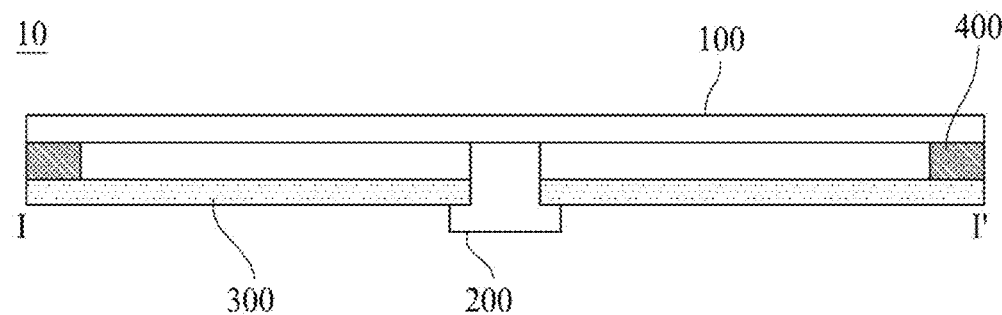
FIG. 1B is a cross-sectional view taken along the line I-I' of FIG. 1A.

FIG. 1B is a cross-sectional view taken along the line I-I' of FIG. 1A.

With reference to FIG. 1B, the display apparatus may include the sound generating device 200 and a supporting member 300.

The supporting member 300 may support one or more of a rear surface and a side surface of the display panel 100. Also, the sound generating device 200 may be fixed to the supporting member 300.

The supporting member 300 may be, for example, a cover bottom. For example, the supporting member 300 may include a middle cabinet, which may be coupled to a cover bottom to surround the side surface of the display panel 100 and may accommodate one edge of the display panel 100 to support the display panel 100. For example, the middle cabinet may include a sideways-"T" (⊢)-shaped cross-sectional surface (or a T-shape having a 90-degree angle). The supporting member 300 may include the cover bottom, or may include the cover bottom and the middle cabinet, but is not limited thereto. For example, the supporting member 300 may include a structure that supports the rear surface or the side surface of the display panel 100.

Moreover, the supporting member 300 may be a plate member that may be provided on the rear surface of the display panel 100 or all over the display panel 100. For example, the supporting member 300 may cover the whole rear surface of the display panel 100 s to be spaced apart from the rear surface. Also, the supporting member 300 may have a plate shape formed of a glass material, a metal material, or a plastic material. Here, an edge or a sharp corner of the supporting member 300 may have a tetragonal (e.g., quadrilateral) shape or a curved shape through a chamfer process or a corner rounding process. According to an embodiment of the present disclosure, the supporting member 300 including the glass material may include sapphire glass. For example, the supporting member 300 including the metal material may include one or more of aluminum (Al), an Al alloy, a magnesium (Mg) alloy, and an iron (Fe)-nickel (Ni) alloy. As another example, the supporting member 300 may have a stacked structure including a glass plate, which may have a thickness relatively thinner than each of a metal plate and a glass plate, and may face the rear surface of the display panel 100. For example, a rear surface of the display apparatus 10 may be used as a mirror surface due to the metal plate. However, embodiments are not limited to the above materials or shape.

Moreover, the supporting member 300 may include a through hole into which the sound generating device 200 may be inserted or accommodated. For example, the through-hole or the hole may be bored in a certain partial region of the supporting member 300 along a thickness direction of the supporting member 300 to have a circular shape or a polygonal shape, for the sound generating device 200 to be inserted into the through-hole.

Moreover, in the present disclosure, the supporting member 300 may be referred to as a "cover bottom," a "plate bottom," a "back cover," a base frame, a metal frame, a metal chassis, a chassis base, or an m-chassis. Therefore, the supporting member 300 may be a supporter for supporting the display panel 100 and may be configured as any type of frame or plate structure each disposed on the rear surface of the display apparatus.

An adhesive member 400 may be in an edge or a periphery of each of the display panel 100 and the supporting member 300. For example, the adhesive member 400 may be between the rear surface of the display panel 100 and an upper surface of the supporting member 300. The adhesive member 400 may attach the display panel 100 to the supporting member 300. Also, the adhesive member 400 may include a double-sided tape, a single-sided tape, an adhesive, a glue, and/or the like, but is not limited thereto.

Figure 2A:
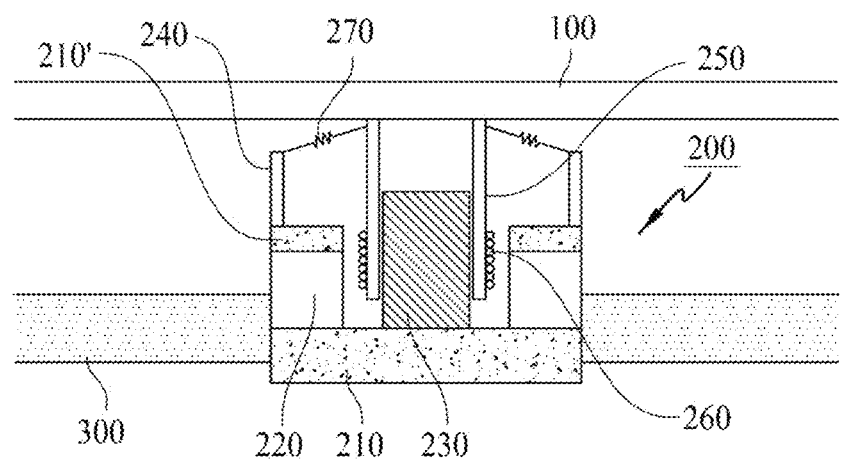
FIGS. 2A and 2B are cross-sectional views of a sound generating device according to an embodiment of the present disclosure.
Figure 2B:
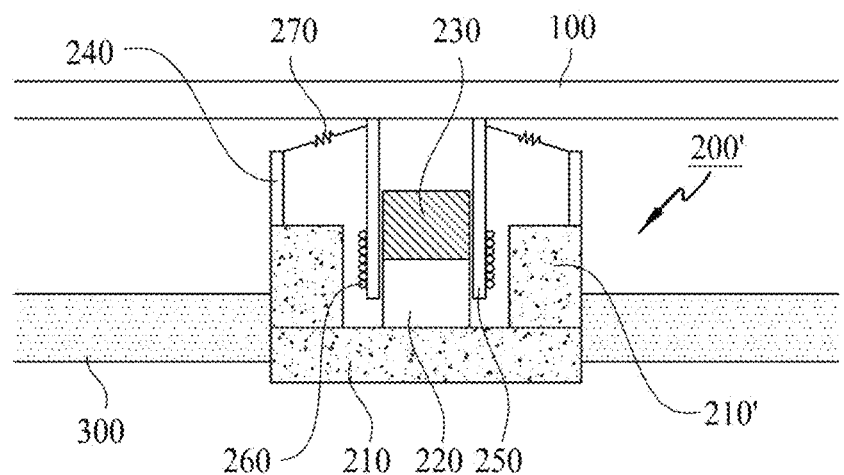

FIGS. 2A and 2B are cross-sectional views of a sound generating device according to an embodiment of the present disclosure.

The sound generating device 200 may be classified into a first structure in which a magnet may be outside a coil, and a second structure in which a magnet may be inside a coil. The first structure may be referred to as a "dynamic type" or an "external magnetic type." Also, the second structure may be referred to as a "micro type" or an "internal magnetic type."

FIG. 2A illustrates the first structure, and FIG. 2B illustrates the second structure.

With reference to FIG. 2A, a sound generating device 200 may include a plurality of plates (for example, first and second plates) 210 and 210', a magnet 220 on a corresponding plate, a center pole 230 disposed on a corresponding plate, a bobbin 250 near the center pole 230, and a coil 260 wound around the bobbin 250.

For example, the magnet 220 may be on the first plate 210, and the second plate 210' may be on the magnet 220. The first plate 210, and the second plate 210' may support the magnet 220 and may fix the sound generating device 200 to a supporting member 300. Therefore, the first plate 210 may be fixed to a supporting hole in the supporting member 300, and the magnet 220 may be fixed and supported between the first plate 210 and the second plate 210'.

At least one of the first plate 210 and the second plate 210' may include a material such as iron (Fe). Each of the first plate 210 and the second plate 210' may be not limited to the term. For example, the first plate 210 or the second plate 210' may be referred to as a "yoke" or the like.

The magnet 220 may be configured with a sintered magnet, such as barium ferrite, and a material of the magnet 220 may use iron (III) oxide ($Fe_2O_3$), barium carbonate ($BaCO_3$; "witherite"), a neodymium magnet, strontium ferrite ($Fe_{12}O_{19}Sr$), e.g., with an improved magnet component, an alloy cast magnet including Al, nickel (Ni), and cobalt (Co), and/or the like, but is not limited thereto. For example, the neodymium magnet may be neodymium-iron-boron (Nd—Fe—B). However, embodiments are not limited thereto.

A frame 240 may be on the second plate 210' along an edge or periphery of the first plate 210. A center pole 230 may be in a central region of the first plate 210. Also, the center pole 230 and the first plate 210 may be provided as one body. Also, the center pole 230 may be referred to as "pole pieces." For example, pole pieces may be further on the center pole 230.

The bobbin 250 may surround the center pole 230. The coil 260 may be wound around a lower region of the bobbin 250 (for example, an outer surface of a lower region of the bobbin 250), and a electrical current for generating a sound may be applied to the coil 260. The bobbin 250 may be a ring-shaped structure, which may include paper, an Al sheet, and/or the like. The coil 260 may be wound around a certain lower region of the bobbin 250. The generic term for the bobbin 250 and the coil 260 may be a "voice coil."

Also, a damper 270 may be between the frame 240 and a portion of an upper portion of the bobbin 250. The damper may be referred to as an "edge" or the like.

FIG. 2B illustrates the second structure in which a magnet may be inside a coil.

With reference to FIG. 2B, a sound generating device 200' having the second structure may include a magnet 220 on a first plate 210, a center pole 230 on the magnet 220, a bobbin 250 near the magnet 220 and the center pole 230, and a coil 260 wound around the bobbin 250.

For example, the first plate 210 may be fixed to a supporting hole in a supporting member 300. The magnet 220 may be on the first plate 210, and the center pole 230 may be on the magnet 220. Also, the center pole 230 may be referred to as "pole pieces." For example, pole pieces may be further on the center pole 230. The bobbin 250 may surround the magnet 220 and the center pole 230, and the coil 260 may be wound around the bobbin 250.

A second plate 210' may be near the first plate 210, and a frame 240 may be outside the second plate 210'. For example, a damper 270 may be between the frame 240 and the bobbin 250.

In comparison with the first structure in which a magnet may be outside a coil, the second structure including an internal magnet may be small in leakage of magnetic flux, and may reduce a total size of a sound generating device. The sound generating device applied to the display apparatus according to an embodiment of the present disclosure is not limited to the first structure illustrated in FIG. 2A and the second structure illustrated in FIG. 2B. For example, the display apparatus according to an embodiment of the present disclosure may include another kind of sound generating device, which may vibrate a display panel to generate sound.

Figure 3A:
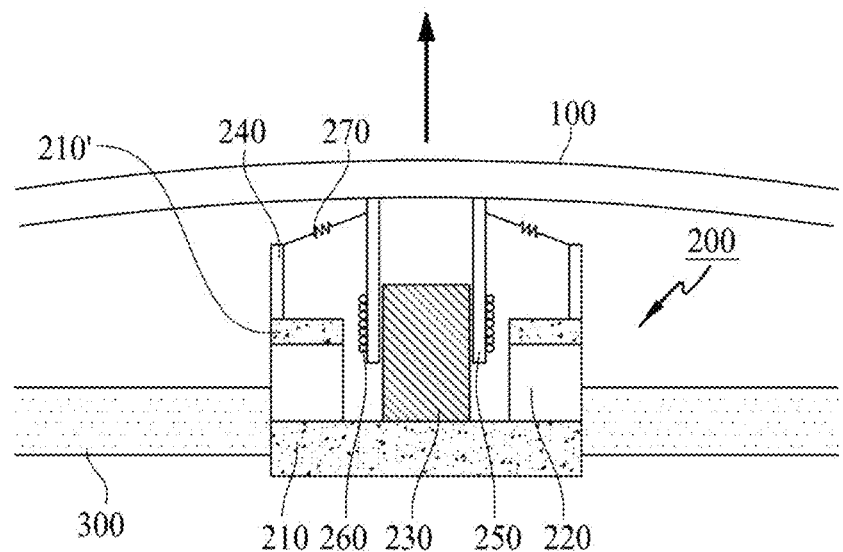
FIGS. 3A and 3B are diagrams for describing a sound generating operation performed by a sound generating device having a first structure according to an embodiment of the present disclosure.
Figure 3B:
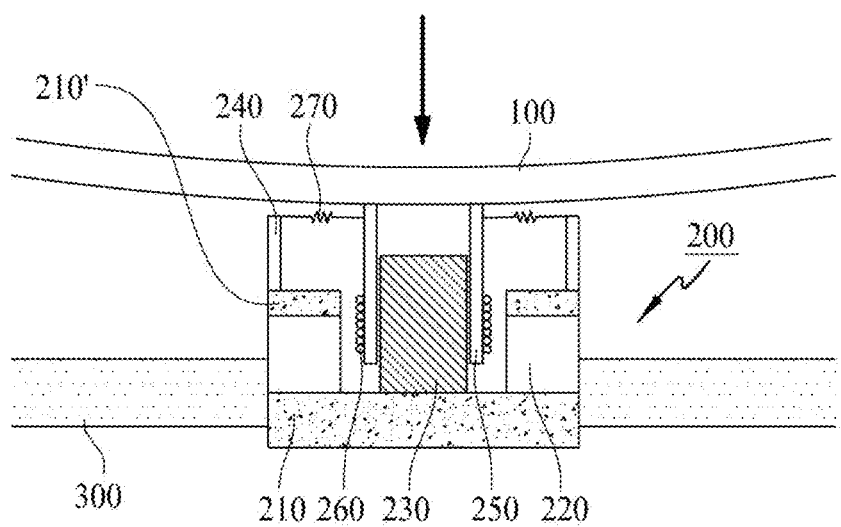

FIGS. 3A and 3B illustrate a sound generating operation performed by a sound generating device having a first structure according to an embodiment of the present disclosure.

FIG. 3A illustrates a state in which a electrical current ma be applied.

The center pole 230 connected to a lower surface of the magnet 220 may be a north (N)-pole, and the second plate 210' connected to an upper surface of the magnet 220 may be a south (S)-pole, and an external magnetic field may be generated around the coil 260. The north and south poles may be interchangeable.

In this state, when a electrical current for generating a sound is applied to the coil 260, an applied magnetic field may be generated around the coil 260, and a force for moving the bobbin 250 to an upper side may be generated by the applied magnetic field and an external magnetic field. For example, when a electrical current is applied to the coil 260, a magnetic field may be generated around the coil 260. Thus, the bobbin 250 may be guided by the center pole 230 and may move to the upper side according to Fleming's Left-Hand Rule for Motors based on the generated magnetic field and the external magnetic field generated by the magnet 220.

Therefore, one surface of the bobbin 250 may contact a rear surface of the display panel 100. Thus, the bobbin 250 may vibrate the display panel 100 in an upward direction (illustrated by an arrow) according to whether a electrical current is applied to the coil 260 or not, and a sound wave (or a sound) may be generated by the vibration of the display panel 100. In this state, when the application of the electrical current stops or a reverse electrical current is applied, as illustrated in FIG. 3B, a force for moving the bobbin 250 to a lower side may be generated according to the principle similar to description given above with reference to FIG. 3A, and the display panel 100 may vibrate in a downward direction (illustrated by an arrow).

The damper 270 may be between a portion of an upper portion of the bobbin 250 and the frame 240. The damper 270 may be provided in a creased structure, and may be contracted and relaxed based on a vertical motion of the bobbin 250 to control a vertical vibration of the bobbin 250. For example, the damper 270 may be connected to the bobbin 250 and the frame 240. Thus, the vertical vibration of the bobbin 250 may be controlled by a restoring force of the damper 270. For example, when the bobbin 250 vibrates by a certain height or more or vibrates by a certain height or less, the bobbin 250 may be restored to an original position by the restoring force of the damper 270. Therefore, the display panel 100 may vertically vibrate based on an application direction and level of a electrical current applied to the coil 260. A sound wave may be generated by the vibration.

Figure 4A:
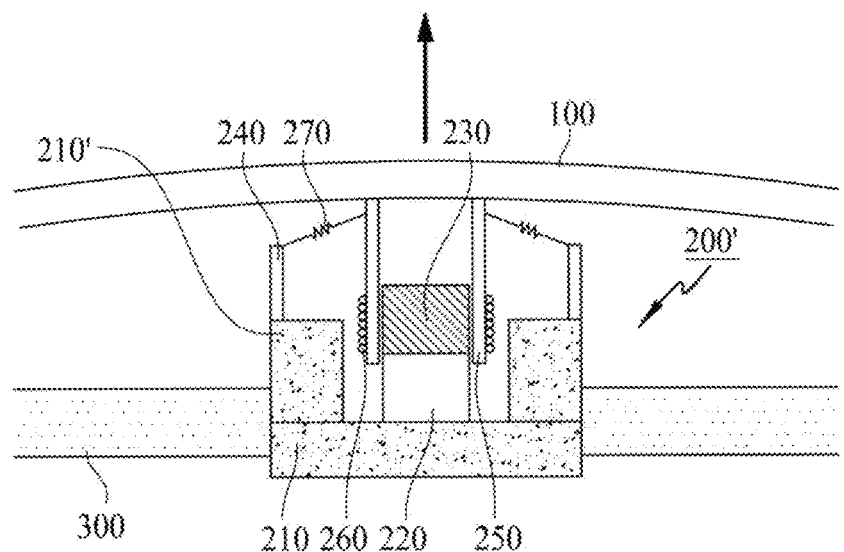
FIGS. 4A and 4B are diagrams for describing a sound generating operation performed by a sound generating device having a second structure according to an embodiment of the present disclosure.
Figure 4B:
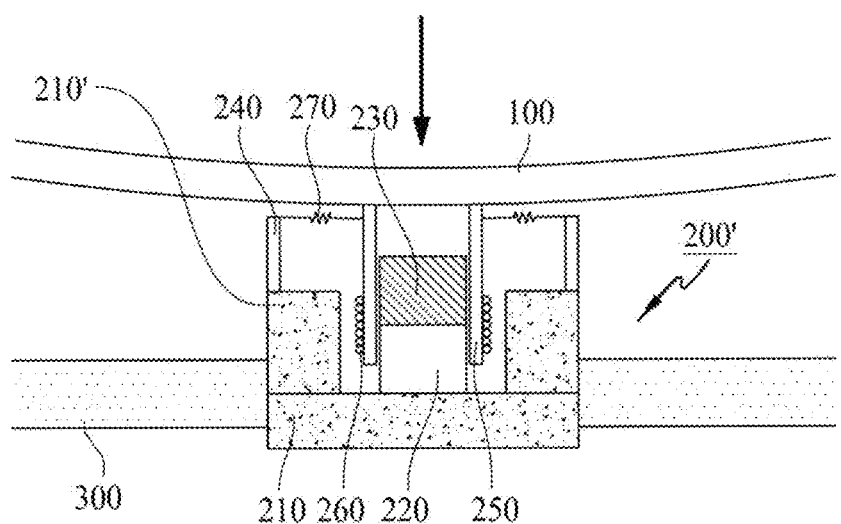

FIGS. 4A and 4B illustrate a sound generating operation performed by a sound generating device having a second structure according to an embodiment of the present disclosure.

FIG. 4A illustrates a state in which a electrical current may be applied. The second plate 210' may be an S-pole, and the center pole 230 connected to an upper surface of the magnet 220 may be an N-pole, whereby an external magnetic field may be generated around the coil 260. The S-pole and the N-pole may switch therebetween, and if the S-pole and the N-pole switches therebetween, the sound generating device may identically operate by correcting a winding direction of the coil 260. In this state, when a electrical current for generating a sound is applied to the coil 260, an application magnetic field may be generated around the coil 260, and a force for moving the bobbin 250 to an upper side may be generated by the application magnetic field and an external magnetic field. For example, when a electrical current is applied to the coil 260, a magnetic field may be generated around the coil 260. Thus, the bobbin 250 may be guided by the center pole 230, and may move to the upper portion according to Fleming's Lefr-Hand Rule for Motors based on the generated magnetic field and the external magnetic field generated by the magnet 220.

Therefore, one surface of the bobbin 250 may contact a rear surface of the display panel 100. Thus, the bobbin 250 may vibrate the display panel 100 in an upward direction (illustrated by an arrow) according to whether a electrical current is applied to the coil 260 or not, and a sound wave (or a sound) may be generated by the vibration of the display panel 100. In this state, when the application of the electrical current stops or a reverse electrical current is applied, as illustrated in FIG. 4B, a force for moving the bobbin 250 to a lower side may be generated according to the principle similar to description given above with reference to FIG. 4A, and the display panel 100 may vibrate in a downward direction (illustrated by an arrow).

Moreover, the damper 270 may be between a partial region of an upper portion of the bobbin 250 and the frame 240. The damper 270 may be provided in a creased structure, and may be contracted and relaxed based on a vertical motion of the bobbin 250 to control a vertical vibration of the bobbin 250. For example, the damper 270 may be connected to the bobbin 250 and the frame 240. Thus, the vertical vibration of the bobbin 250 may be controlled by a restoring force of the damper 270. For example, when the bobbin 250 vibrates by a certain height or more or vibrates by a certain height or less, the bobbin 250 may be restored to an original position by the restoring force of the damper 270. Therefore, the display panel 100 may vertically vibrate based on an application direction and level of a electrical current applied to the coil 260. A sound wave may be generated by the vibration.

Figure 5A:
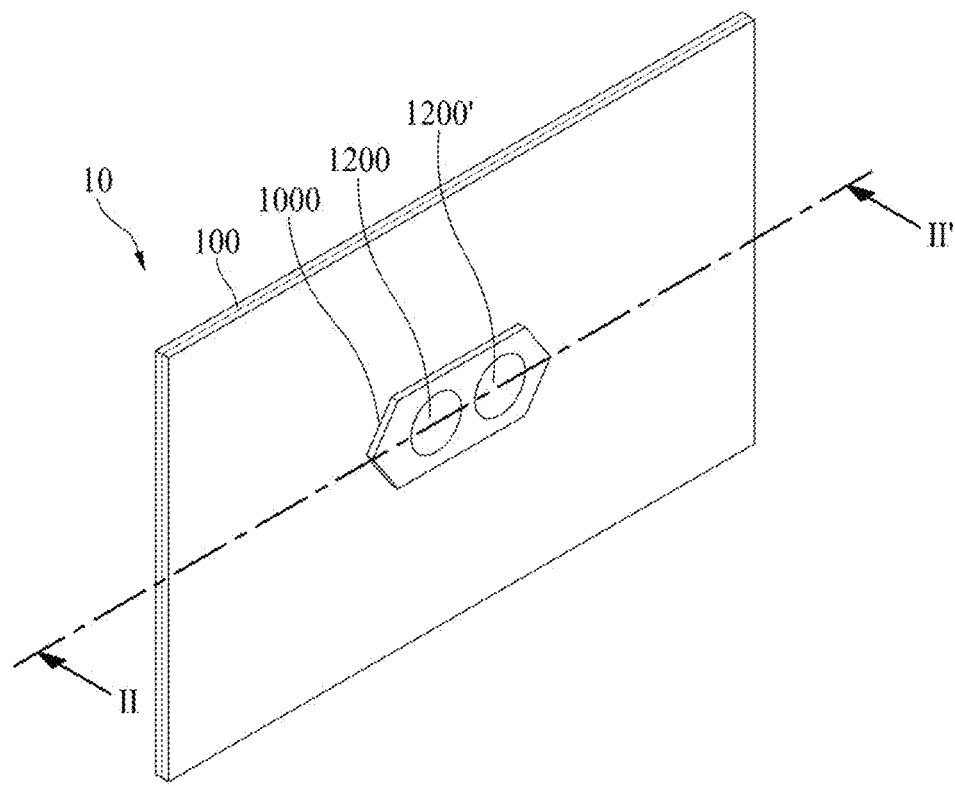
FIG. 5A illustrates a sound generating device according to an embodiment of the present disclosure
Figure 5B:
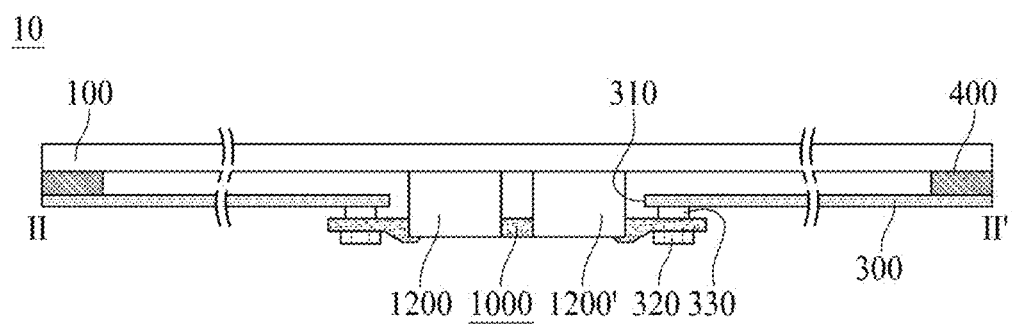
FIG. 5B is a cross-sectional view taken along the line II-II' of FIG. 5A.

FIG. 5A illustrates another embodiment of a sound generating device according to the present disclosure. FIG. 5B is a cross-sectional view taken along the line II-II' of FIG. 5A.

With reference to FIG. 5A, a display apparatus 10 may include a display panel 100, which may display an image, and first and second sound generating devices 1200 and 1200', which may vibrate the display panel 100 to generate a sound.

The first sound generating device 1200 and the second sound generating device 1200' may be disposed adjacent to each other. When a plurality of sound generating devices are apart from one another, it may be difficult to uniformly maintain a contact characteristic between the sound generating devices and the display panel 100, and sound quality may be degraded due to interference and delay between the plurality of sound generating devices. Therefore, in an embodiment of the present disclosure in which sound generating devices are adjacent to each other, interference or delay between sound waves generated by the sound generating devices may be reduced compared to when a plurality of sound generating devices are spaced apart from one another. Thus, a sound output characteristic may be enhanced.

The first structure or the second structure, each described above with reference to FIG. 2A or 2B, may be applied to a structure of each of the first sound generating device 1200 and the second sound generating device 1200'.

The display apparatus 10 may include a fixing device 1000 for fixing the first sound generating device 1200 and the second sound generating device 1200'. The fixing device 1000 may include a mold structure, which include a material, such as plastic and/or the like, through a molding process, but is not limited thereto. The fixing device 1000 will be described below with reference to FIG. 6.

With reference to FIG. 5B, the display apparatus 10 may include the first sound generating device 1200, the second sound generating device 1200', and a supporting member 300.

The supporting member 300 may support one or more of a rear surface and a side surface of a display panel 100. Also, the supporting member 300 may be a plate member, which may include a metal or plastic material, and may be provided on the rear surface of the display panel 100 or all over the display panel 100.

The first sound generating device 1200 and the second sound generating device 1200' may be accommodated into a supporting hole 310 included in the supporting member 300. When the first sound generating device 1200 and the second sound generating device 1200' are inserted into and fixed to the supporting hole 310, a height of each of the first sound generating device 1200 and the second sound generating device 1200' disposed between the rear surface of the display panel 100 and an inner surface of the supporting member 300 may be reduced. Thus, a space or a region for generating a sound may be small.

For example, the display apparatus may further include a nut 330 fixed to the supporting member 300, and the fixing device 1000 may be fixed to the nut 330 by a screw 320 inserted into a mounting hole of the fixing device 1000. For example, a screw-through-hole or a hole may be provided in an inner surface of the nut 330. Thus, after the mounting hole of the fixing device 1000 is aligned with the screw-through hole of the nut 330, the fixing device 1000 may be fixed to the supporting member 300 by fastening the screw 320.

The nut 330 may be, for example, a self-clinching nut. An example of the self-clinching nut may include PEM® nut. If the self-clinching nut is used, a portion of a vibration generated by each of the first and second sound generating devices 1200 and 1200' may be absorbed by the self-clinching nut. Accordingly, a vibration transferred to the supporting member 300 may be reduced.

In the display apparatus according to an embodiment of the present disclosure, the supporting member 300 and the first and second sound generating devices 1200 and 1200' may be fixed by the nut and the screw each included in the supporting member. Thus, a thickness of the display panel 100 may be reduced.

An adhesive member 400 may be in an edge or periphery of each of the display panel 100 and the supporting member 300, and may attach the display panel 100 on the supporting member 300. The adhesive member 400 may include a double-sided tape, a single-sided tape, an adhesive, a glue, and/or the like, but is not limited thereto.

Figure 6:
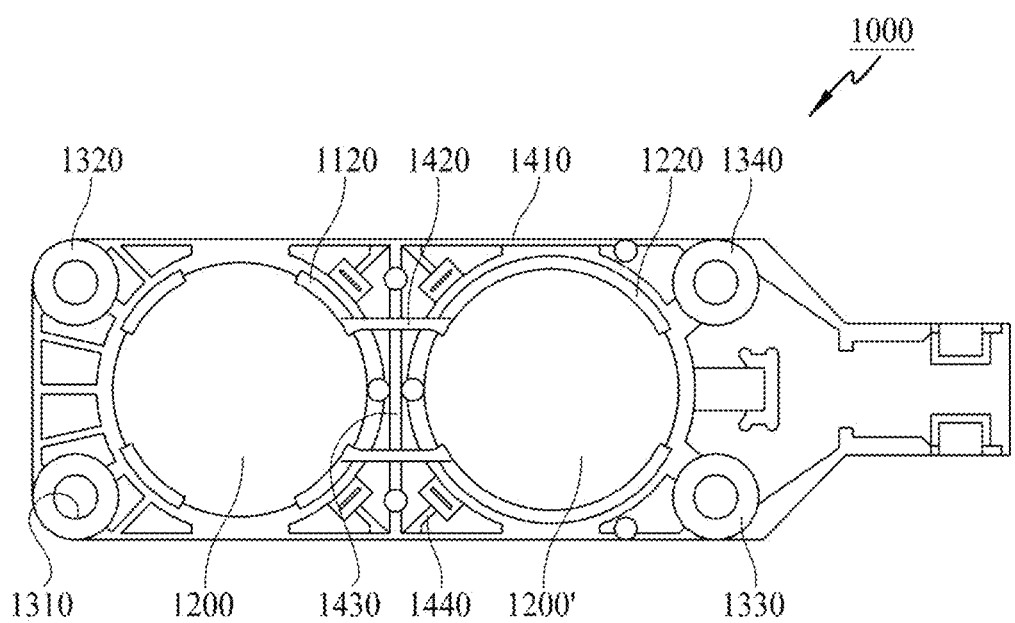
FIG. 6 illustrates a fixing device of a sound generating device according to another embodiment of the present disclosure.

FIG. 6 illustrates a fixing device of a sound generating device according to another embodiment of the present disclosure.

With reference to FIG. 6, the fixing device 1000 of the sound generating device may be an integrated fixing device, which may fix and support a first sound generating device 1200 and a second generating device 1200' to be adjacent to each other. Therefore, the first sound generating device 1200 and the second generating device 1200' each fixed by the fixing device 1000, may be a pair of sound generating devices and may be referred to as "a pair of sound generating devices." The fixing device 1000 of the sound generating device may include a supporting part that may support the first sound generating device 1200 and the second generating device 1200', a plurality of rib parts that may be near the first sound generating device 1200 and the second generating device 1200', and a plurality of mounting holes for fixing the fixing device 1000 to a supporting member 300.

For example, the supporting part may include a first supporting part 1120 that may support the first sound generating device 1200 and a second supporting part 1220 that may support the second sound generating device 1200'. The first supporting part 1120 may support a portion of each of a side surface and a rear surface of the first sound generating device 1200. The first supporting part 1120 may have a cylindrical shape, but is not limited thereto. The second supporting part 1220 may support a portion of each of a side surface and a rear surface of the second generating device 1200'. The second supporting part 1220 may have a cylindrical shape, but is not limited thereto.

For example, each of the first supporting part 1120 and the second supporting part 1220 may further include two or four arc-shaped protrusions. One surface of each of the protrusions may be bent to an inner side of each of the first and second sound generating devices 1200 and 1200', and may support a portion of a rear surface of each of the first and second sound generating devices 1200 and 1200', avoiding or preventing the first and second sound generating devices 1200 and 1200' from deviating to the outside of the fixing device 1000 of the sound generating device.

A plurality of rib parts may be near the first supporting part 1120 and the second supporting part 1220, for maintaining a rigidity of the fixing device 1000 of the sound generating device and for avoiding or preventing the fixing device 1000 of the sound generating device from being deformed even when being used for a long time.

For example, the rib parts may include a first rib part 1410 that may extend in a widthwise direction from an outer portion of each of the first and second supporting parts 1120 and 1220, a second rib part 1420 that may connect the first supporting part 1120 to the second supporting part 1220 in the widthwise direction, and a third rib part 1430 that may be connected to the first rib part 1410 in a lengthwise direction. The widthwise direction may be a direction toward a long side on which a pair of sound generating devices may be disposed. The lengthwise direction may be a direction vertical (or perpendicular) to the widthwise direction. Alternatively, the widthwise direction may be a widthwise direction of a display panel, and a vertical direction may be a lengthwise direction of the display panel.

The first rib part 1410 may extend along a horizontal direction from an outer surface of each of the first and second supporting parts 1120 and 1220 to form a widthwise-direction outer structure of the fixing device 1000 of the sound generating device. A central region (e.g., a central region between the first supporting part 1120 and the second supporting part 1220) of the first rib part 1410 may be higher in height and thicker in thickness than both side regions of the first rib part 1410. Therefore, even when two sound generating devices vibrate for a long time, a fixing device of each of the two sound generating devices may not be deformed, and a relative position change between the two sound generating devices and the display panel may be reduced.

One or more second rib parts 1420 may be between the first supporting part 1120 and the second supporting part 1220 and may be connected as one body. The one or more second rib parts 1420 may be inward from the first rib part 1410. In the example of FIG. 6, two second rib parts 1420 are illustrated as being provided, but are not limited thereto. For example, the second rib part 1420 may be provided as one, three, or more.

One or more third rib parts 1430 may be connected to the first rib part 1410 and the second rib part 1420 which are provided as one body. The one or more third rib parts 1430 may extend in the widthwise direction and may be between second rib parts 1420 or first rib parts 1410.

In the embodiment of FIG. 6, one third rib part 1430 may be illustrated and may extend along the lengthwise direction between two first rib parts 1410, but is not limited thereto. For example, the third rib part 1430 may extend by a shorter distance between two second rib parts 1420.

The rib part may further include one or more fourth rib parts 1440, which may obliquely extend between the first supporting part 1120 and the first rib part 1410 or between the second supporting part 1220 and the first rib part 1410. The fourth rib parts 1440 may reduce or prevent the bending deformation of the fixing device 1000 of the sound generating device caused by the long-time driving of the sound generating device.

Therefore, the display apparatus according to the present embodiment may include a fixing device for fixing a pair of sound generating devices and a plurality of rib parts near the sound generating devices. Accordingly, the rigidity of each sound generating device may be maintained, and a sound characteristic change caused by a long-time operation may be reduced.

A distance between the first supporting part 1120 and the second supporting part 1220 may be greater than a minimum threshold value that may enable a rib part to be formed, and may be less than a maximum threshold value corresponding to a diameter of each of the first sound generating device 1200 and the second sound generating device 1200'. If the distance between the first supporting part 1120 and the second supporting part 1220 is greater than the maximum threshold value, sound quality may be degraded. Therefore, the distance between the first supporting part 1120 and the second supporting part 1220 may be less than the diameter of each of the first sound generating device 1200 and the second sound generating device 1200'. Thus, the degradation in sound quality may be reduced or prevented. For example, when a size (or a diameter) of the sound generating device is D, the distance between the first supporting part 1120 and the second supporting part 1220 may be greater than, e.g., about 7 mm corresponding to an example of the minimum threshold value and may be less than the size D of the sound generating device. In an embodiment, it may be seen that the change in sound quality characteristic may not be greater when the size D of the sound generating device is, e.g., about 28 mm, than when the size D of the sound generating device is, e.g., about 0.85*D (e.g., about 23.6 mm).

A plurality of mounting holes 1310, 1320, 1330, and 1340 for fixing the fixing device 1000 to the supporting member 300 may be provided. The through hole may be provided in the inner surface of the nut 330 illustrated in FIG. 5B. The mounting holes 1310, 1320, 1330, and 1340 of the fixing device 1000 and the through hole of the nut 330 may be aligned. Then, by fastening the screw 320, the fixing device 1000 may be fixed to the supporting member 300.

When a pair of sound generating devices according to another embodiment of the present disclosure is applied, a uniform sound pressure may be generated in a full frequency band. Thus, a good sound output characteristic may be realized.

Figure 7:
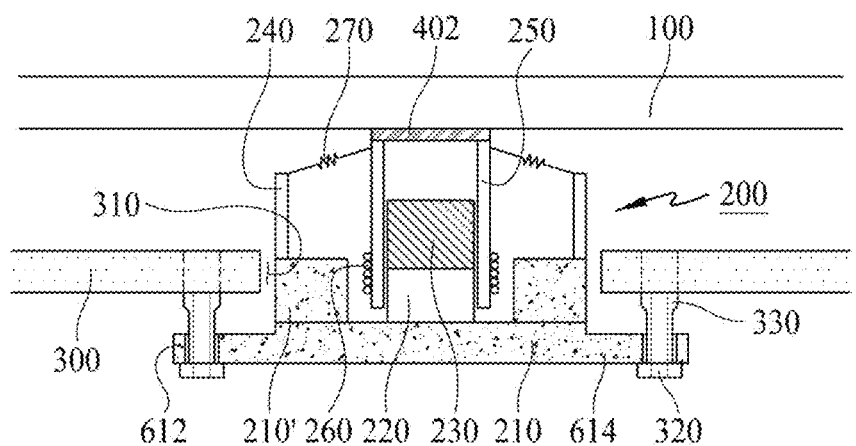
FIG. 7 illustrates a connection structure of a supporting member and a sound generating device according to an embodiment of the present disclosure.

FIG. 7 illustrates a connection structure of a supporting member and a sound generating device according to an embodiment of the present disclosure.

In an embodiment of the present disclosure, any of a sound generating device having the first structure and a sound generating device having the second structure may be applied. Hereinafter, a sound generating device having the second structure will be described as an example.

With reference to FIG. 7, a sound generating device 200 may include a diameter enlargement part 614. The diameter enlargement part 614 may be provided as one body with a first plate 210 of the sound generating device 200. The first plate 210 of the sound generating device 200 may not have a cylindrical shape. One side of the first plate 210 may include a protrusion that may be greater than a diameter of the other portion of the first plate 210. A protrusion region having an enlarged diameter may be referred to as a "diameter enlargement part 614." The diameter enlargement part 614 may be provided in a ring shape. Also, an extension part 612 for fixing the sound generating device 200 may be provided in a portion of the diameter enlargement part 614.

A screw 320 and a nut 330 may be provided on the extension part 612. The sound generating device 200 may be coupled or connected to a supporting member 300 by the screw 320 using the nut 330 fixed to the supporting member 300. The nut 330 may be, for example, a self-clinching nut. An example of the self-clinching nut may include PEM® nut, and embodiments are not limited thereto.

If the self-clinching nut is used, a portion of a vibration generated by the sound generating device 200 may be absorbed by the self-clinching nut which is the nut 330. Thus, a vibration transferred to the supporting member 300 may be reduced. Also, the sound generating device 200 may be accommodated into the supporting hole 310 provided in the supporting member 300.

The display panel 100 may be attached to the bobbin 250 of the sound generating device 200 by using an adhesive member 402. The adhesive member 402 may include a double-sided tape, a single-sided tape, an adhesive, a glue, and/or the like, but is not limited thereto. As illustrated in FIG. 7, the adhesive member 402 may be in a portion where the sound generating device 200 is attached on the display panel 100, but is not limited thereto. In other embodiments, the adhesive member 402 may be on a whole rear surface of the display panel 100. For example, the adhesive member 402 may be on a whole surface between the display panel 100 and the sound generating device 200.

Figure 8:
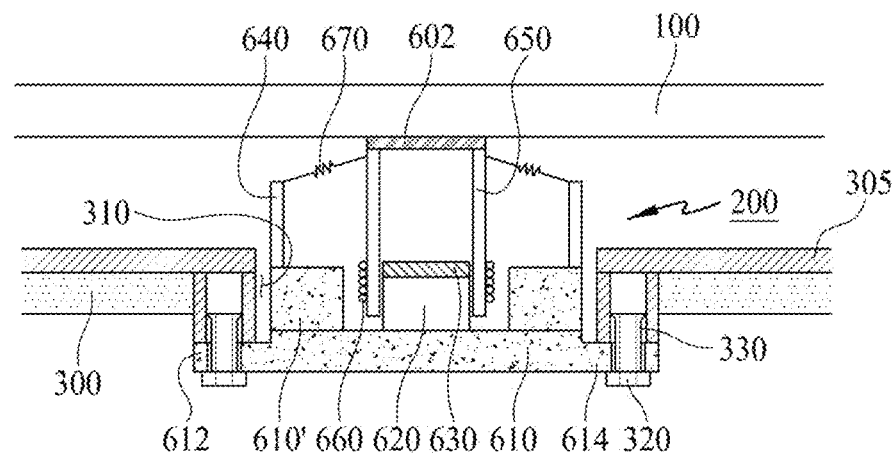
FIG. 8 illustrates a connection structure of a supporting member and a sound generating device according to another embodiment of the present disclosure.

FIG. 8 illustrates a connection structure of a supporting member and a sound generating device according to another embodiment of the present disclosure.

In an embodiment of the present disclosure, any of a sound generating device having the first structure and a sound generating device having the second structure may be applied. Hereinafter, the second structure will be described as an example.

With reference to FIG. 8, a sound generating device 200 may include a magnet 620 on a first plate 610, a center pole 630 on the magnet 620, a bobbin 650 near the magnet 620 and the center pole 630, and a coil 660 wound around the bobbin 650. For example, a second plate 610' may be disposed near the first plate 610, and a frame 640 may be disposed near the second plate 610'. Also, a damper 670 may be between the frame 640 and the bobbin 650. A description of the sound generating device 200 may be substantially similar to description given above with reference to FIG. 2, and thus, may be omitted.

The sound generating device 200 may further include a diameter enlargement part 614. The diameter enlargement part 614 may be provided as one body with the first plate 610 of the sound generating device 200. The first plate 610 of the sound generating device 200 may have a cylindrical shape. One side of the first plate 610 may include a protrusion which is greater than a diameter of the other portion of the first plate 610. A protrusion region having a relatively enlarged diameter may be referred to as a diameter enlargement part 614. The diameter enlargement part 614 may be provided in a ring shape. Also, an extension part 612 for fixing the sound generating device 200 may be provided in a portion of the diameter enlargement part 614.

A screw 320 and a nut 330 may be in the extension part 612. The nut 330 may be, for example, a self-clinching nut. An example of the self-clinching nut may include PEM® nut, and embodiments are not limited thereto. The sound generating device 200 may be fixed to the supporting member 300 by the screw 320 and the nut 330. If the self-clinching nut is used for connecting the supporting member 300 to the sound generating device 200, a vibration generated by the sound generating device 200 may be absorbed by the self-clinching nut, and thus, a vibration transferred to the supporting member 300 may be reduced. When the supporting member 300 is directly coupled or connected to the sound generating device 200 without the self-clinching nut, a vibration which is generated when the sound generating device 200 is operating may be transferred to the supporting member 300 for a long time. In this case, when the supporting member 300 has a thin thickness, the supporting member 300 may be bent or deformed. For example, when the supporting member 300 is thin, the sound generating device 200 may be directly coupled to the screw 320 of the supporting member 300. Accordingly, a fixing force between the supporting member 300 and the sound generating device 200 may not be sufficient.

Therefore, when a nut is provided for fixing a sound generating device to a supporting member, bending or deformation of the supporting member may be prevented, and a thickness of the supporting member may be thickened for enhancing a fixing force between the supporting member and the sound generating device. Since a thickness of the supporting member is thickened, a problem where a thickness of a display apparatus is thickened may occur. When the supporting member is formed of glass or stainless steel for improving an appearance design of the display apparatus, it is unable to insert a nut into the supporting member.

Therefore, a second supporting member 305 may be further provided on the supporting member 300 in order for the nut 330 to be inserted and accommodated into the supporting member 300. The second supporting member 305 may be disposed more adjacent to the display panel 100 than the supporting member 300.

The second supporting member 305 may be formed of a metal material, and the nut 330 may be inserted or accommodated into the second supporting member 305. The sound generating device 200 may be coupled or connected to the supporting member 300 and the second supporting member 305 by the screw 320 using the nut 330 fixed to the supporting member 300. The sound generating device 200 may be accommodated by a supporting hole 310 provided in the second supporting member 305 and the supporting member 300. The supporting member 300 and the second supporting member 305 may be fixed by an adhesive member. The adhesive member may include a double-sided tape, a single-sided tape, an adhesive, a glue, and/or the like, but is not limited thereto. The second supporting member 305 may be formed of, for example, aluminum (Al) which is a metal material, but is not limited thereto. The second supporting member 305 may be referred to as an inner plate.

Since the supporting member 300 is formed of glass or stainless steel, an appearance design of the display apparatus may be improved. Therefore, since the second supporting member 305 is further provided, the sound generating device 200 may get close to a front surface of the display panel 100 by a distance corresponding to a thickness of the supporting member 300, and thus, a thickness of the display apparatus may be reduced. Therefore, since the second supporting member is further provided, the sound generating device may be configured to be thinner, and thus, a thickness of the display apparatus may be reduced. Therefore, since the second supporting member is further provided, a thickness of the sound generating device may be reduced, thereby solving a problem where a thickness or height of a supporting plate covering the sound generating device increases. Accordingly, the sound generating device and a electrical wiring may be disposed under the supporting plate, thereby providing a display apparatus having a sense of beauty in appearance.

An adhesive member 602 for attaching the sound generating device 200 on the display panel 100 may be provided. The adhesive member 602 may include a double-sided tape, a single-sided tape, an adhesive, a glue, and/or the like, but is not limited thereto. As in FIG. 8, the adhesive member 602 may be provided in a portion where the sound generating device 200 is attached on the display panel 100, but is not limited thereto. In other embodiments, the adhesive member 602 may be on a whole rear surface of the display panel 100. For example, the adhesive member 602 may be on a whole surface between the display panel 100 and the sound generating device 200.

Figure 9A:
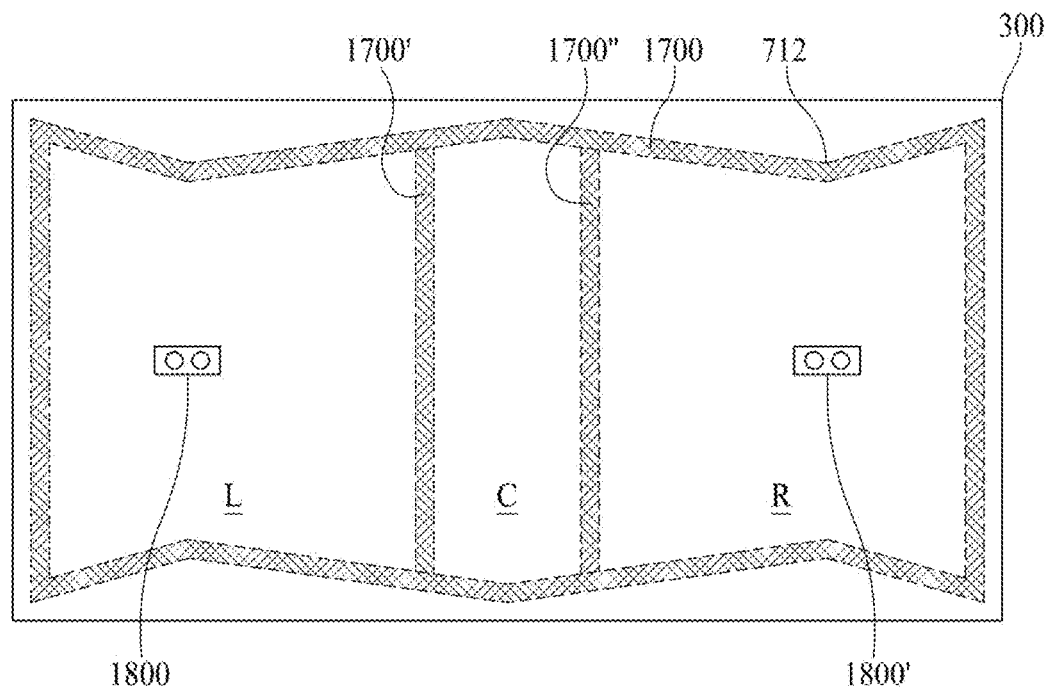
FIGS. 9A and 9B illustrate a sound generating device and a partition in a display apparatus according to an embodiment of the present disclosure.
Figure 9B:
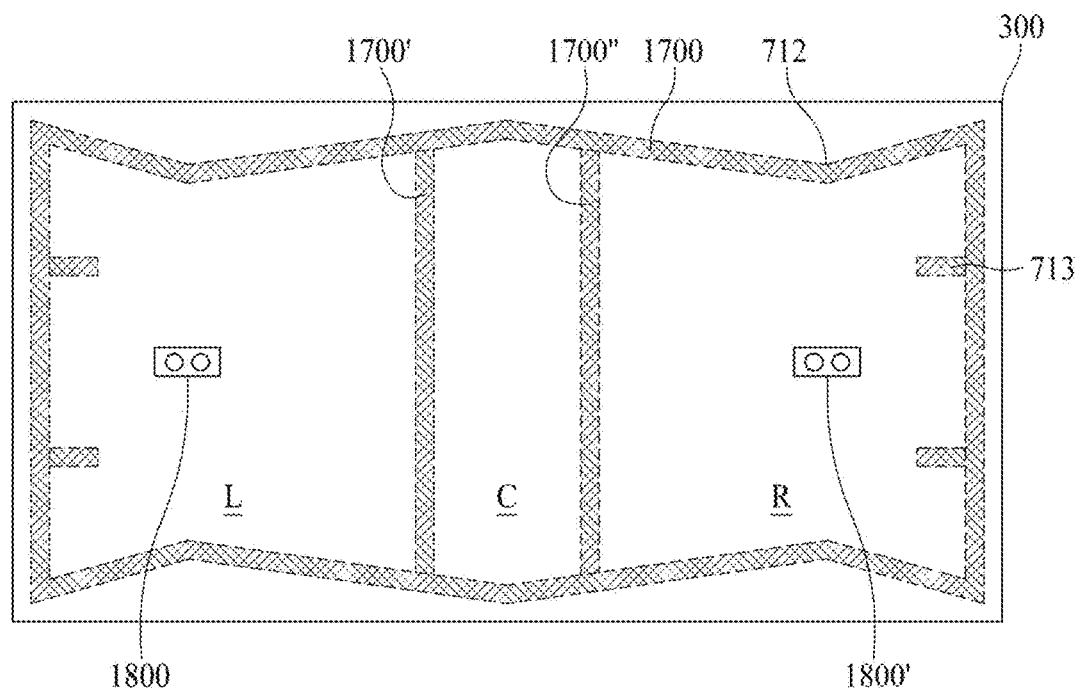

FIGS. 9A and 9B illustrate a sound generating device and a partition in a display apparatus according to an embodiment of the present disclosure.

With reference to FIGS. 9A and 9B, a display panel 100 may include a first region L, a second region R, and a third region C. The first region L may be a left region of a rear surface of the display panel 100, the second region R may be a right region of the rear surface of the display panel 100, and the third region C may be a central region of the rear surface of the display panel 100. The left region and the right region may be compatible, and for convenience, description will be given below with reference to the illustration. A first sound generating device 1800 may be in the first region L of the rear surface of the display panel 100, and a second sound generating device 1800' may be in the second region R of the rear surface of the display panel 100. As mentioned above "left", "right", and "central" are non-limiting terms.

For example, the first sound generating device 1800 and the second sound generating device 1800' may be configured as a pair of sound generating devices. The pair of sound generating devices may be the same as descriptions given above with reference to FIGS. 5 and 6, and thus, their detailed descriptions will be omitted.

A partition may include a first partition 1700, a second partition 1700', and a third partition 1700". Each of the first partition 1700, the second partition 1700', and the third partition 1700" may be an air gap or a space which a sound may be generated when the display panel 100 vibrates by the first sound generating device 1800 and the second sound generating device 1800'. Also, the second partition 1700' and the third partition 1700" may separate a left sound and a right sound respectively generated by the first sound generating device 1800 and the second sound generating device 1800'.

A sound wave, which may be generated when a display panel vibrates by a vibration generating device, may be spread radially from a center of the vibration generating device, and may travel. The sound wave may be referred to as a "progressive wave." The progressive wave may be reflected by one side of a partition to generate a reflected wave, and the reflected wave may travel a direction opposite to the progressive wave. The reflected wave may overlap and interfere with the progressive wave, and may not travel, thereby generating a standing wave that may stand at a certain position. A sound pressure may be reduced by the standing wave, and thus, a sound output characteristic may be reduced. Therefore, a bent portion 712 may be provided in the partition to decrease the degree of reduction in sound pressure caused by the standing wave generated by interference between the reflected wave and the progressive wave. Also, the standing wave, which may cause the sound pressure to be reduced, may be generated a great amount at a position at which a level of each of the progressive wave and the reflected wave may be high. Accordingly, the bent part may be at a position at which a level of a sound wave transferred from the vibration generating device may be highest. This will be described below with reference to FIGS. 9A and 9B.

With reference to FIGS. 9A and 9B, a partition may be provided, and the bent portion 712 may be further provided on at least one side of the partition. The first sound generating device 1800 may be in the first region L, which may be the left region of the rear surface of the display panel 100, and the second sound generating device 1800' may be in the second region R, which may be the right region of the display panel 100. Also, the second partition 1700' and the third partition 1700" may be between the first sound generating device 1800 and the second sound generating device 1800'.

The first partition 1700 may be between the display panel 100 and the supporting member 300. For example, the first partition 1700 may be in an edge or periphery of the supporting member 300. The first partition 1700, the second partition 1700', and the third partition 1700" may be on the rear surface of the display panel 100 or an upper surface of the supporting member 300. The first partition 1700 may be in an edge or periphery of the display panel 100. For example, the first partition 1700 may be in an edge or periphery of the rear surface of the display panel 100. Here, an example where the first partition 1700 is in the supporting member 300 will be described.

A bent portion 712 may be on one or more sides of the first partition 1700. The bent portion 712 may be provided on one or more sides, which a strongest sound wave may reach among four sides of the first partition 1700, and may face the first and second sound generating devices 1800 and 1800'. For example, the bent portion 712 may face the first and second sound generating devices 1800 and 1800'. The bent portion 712 may be configured with two rectilinear parts, and may be provided at a position at which the two rectilinear parts contact each other. Accordingly, the degree of reduction in a sound pressure caused by a standing wave may be reduced.

With reference to FIG. 9B, the bent portion 712 and a protrusion portion 713 may be in the first partition 1700. For example, the bent portion 712 may be on one or more sides of the first partition 1700, and one or more protrusion portion 713 may be provided on a side vertical to a side on which the bent portion 712 is provided. The protrusion portion 713 may more decrease the degree of reduction in a sound pressure caused by a standing wave which may occur due to interference between a reflected wave and a progressive wave.

A substrate configuring the display panel 100 may use a glass substrate. To implement a display apparatus having a thin thickness, a thickness of the glass substrate may be thin. For example, using the glass substrate having a thickness thinned from 0.7 mm to 0.5 mm, the display apparatus may be more thinly implemented. When the thickness of the substrate is thinned, and when the partition is provided on the rear surface of the display panel 100 or an upper surface of a supporting member, a problem in which the display panel 100 may be not flat and a step height may be formed in the display panel 100 may occur due to the partition when the supporting member is attached on the display panel 100. For example, a problem in which the display panel 100 may be not flat and a screen may be unevenly seen may occur due to a shape of the bent portion bouncing on a screen of the display panel 100 or a separated portion of the bent portion, for example, a portion in which the two rectilinear portions contact each other. Such a phenomenon may be referred to as an uneven phenomenon or a wave phenomenon of the display panel 100, and the term is not limited thereto. This will be described below with reference to FIGS. 10 to 12B.

Figure 10:
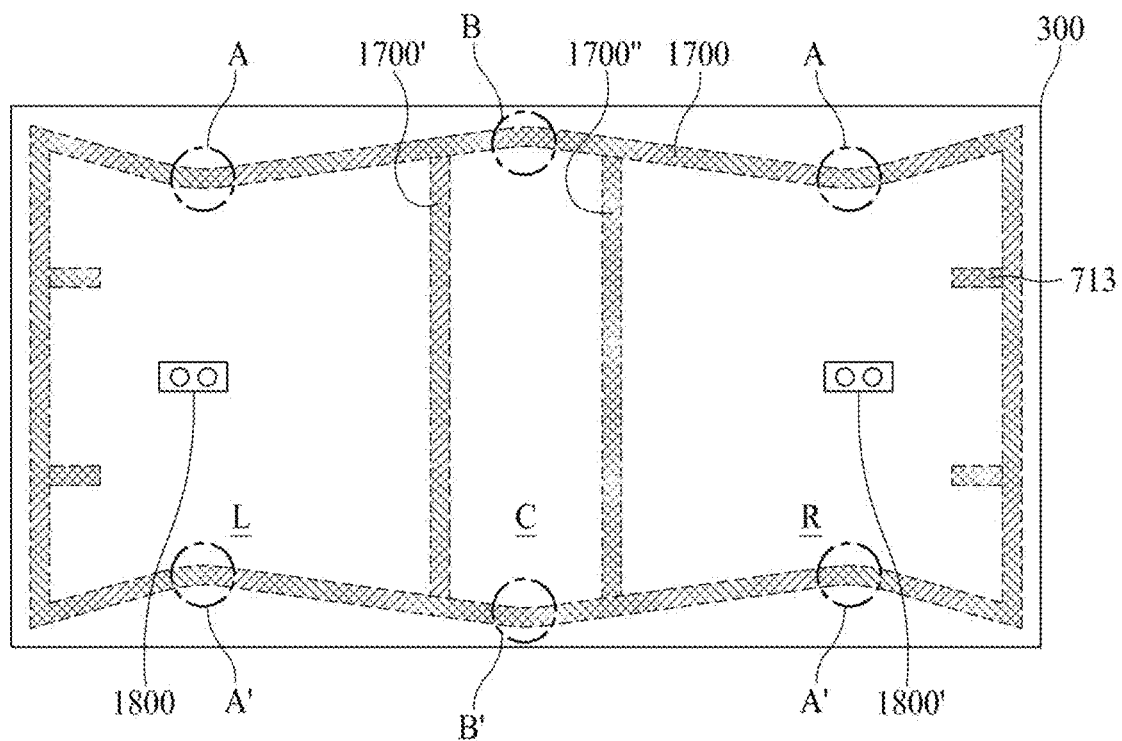
FIG. 10 illustrates a sound generating device and a partition in a display apparatus according to another embodiment of the present disclosure.

FIG. 10 illustrates a sound generating device and a partition in a display apparatus according to an embodiment of the present disclosure.

With reference to FIG. 10, a display panel according to an embodiment of the present disclosure may be configured by changing the shape of the bent portion 712, described above with reference to FIG. 9, to a concave shape or a round shape. This may solve a wave phenomenon of the display panel by changing the shape of the bent portion 712. An experiment result obtained by testing the display panel according to the present embodiment will be described below with reference to FIGS. 11 and 12.

FIGS. 11A to 12B illustrate examples of an experimental result obtained by measuring a rear surface of a display panel.

Figure 11A:
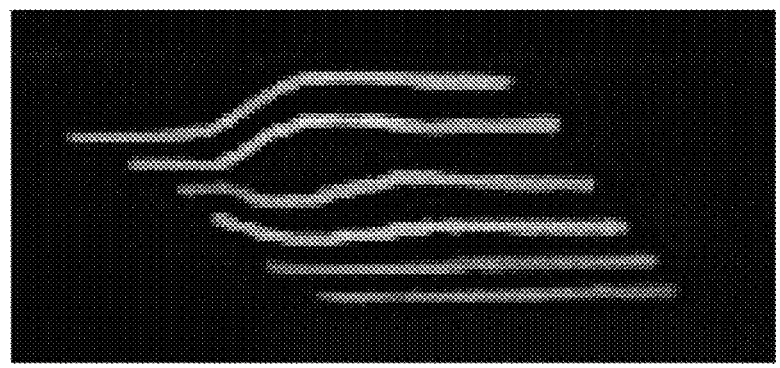
FIGS. 11A to 12B illustrate experimental results obtained by measuring a rear surface of a display panel, in a display apparatus according to an embodiment of the present disclosure
Figure 11B:

FIGS. 11A and 11B show experimental results obtained by measuring a portion A and a portion A' of the FIG. 10 example. The portion A and the portion A' are in a supporting member 300. The region A is a bent portion 712 provided in a first partition 1700 disposed in a first region L, and the portion A' is a bent portion 712 provided in a first partition 1700 disposed in a second region R. FIG. 11A shows the portion A of FIG. 10, and FIG. 11B shows the portion A' of the FIG. 10 example. In FIGS. 11A and 11B, a white portion is a portion in which a wave phenomenon occurs. Therefore, it may be seen that the wave phenomenon of the display panel occurs less in the portion A' (FIG. 11B) than the portion A (FIG. 11A), but the wave phenomenon still occurs.

Figure 12A:
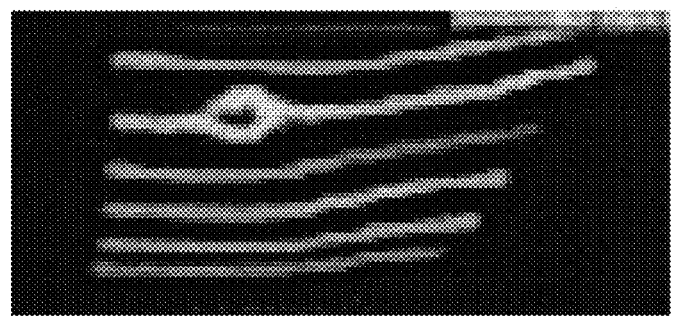
Figure 12B:
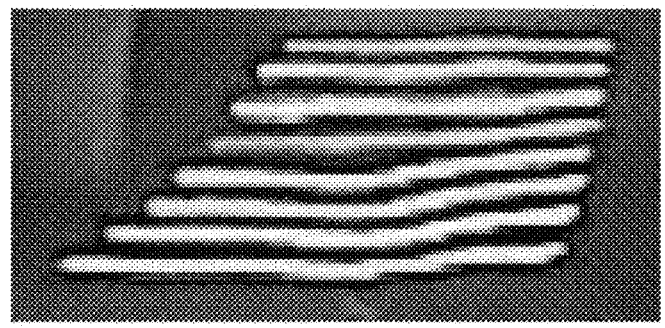

FIGS. 12A and 12B illustrate experimental results obtained by measuring a portion B and a portion B' of the FIG. 10 example. The portion B and the portion B' are in a supporting member 300. Each of the portion B and the portion B' may be a bent portion 712 provided in a first partition 1700 disposed in a third region C. FIG. 12A shows the portion B of FIG. 10, and FIG. 12B shows the portion B' of the FIG. 10 example. In FIGS. 12A and 12B, a white portion is a portion in which a wave phenomenon occurs. Therefore, it may be seen that the wave phenomenon of the display panel occurs less in the portion B' (FIG. 12B) than the portion B (FIG. 12A), but the wave phenomenon still occurs. Accordingly, it may be seen that, even when a shape of a bent portion is modified, the wave phenomenon still occurs.

Therefore, the present inventors have configured the bent portion that allows a vibration to be laterally spread, for controlling a peak or dipping caused by a standing wave of a sound generating device in a lengthwise direction (e.g., a lengthwise direction of a display panel), but have recognized that the wave phenomenon still occurs For this reason, the present inventors have performed various experiments for controlling the peak or the dipping caused by the standing wave or decreasing the wave phenomenon. Through the various experiments, the present inventors have invented a display apparatus having a new structure. This will be described below with reference to FIGS. 13A to 17B.

Figure 13A:
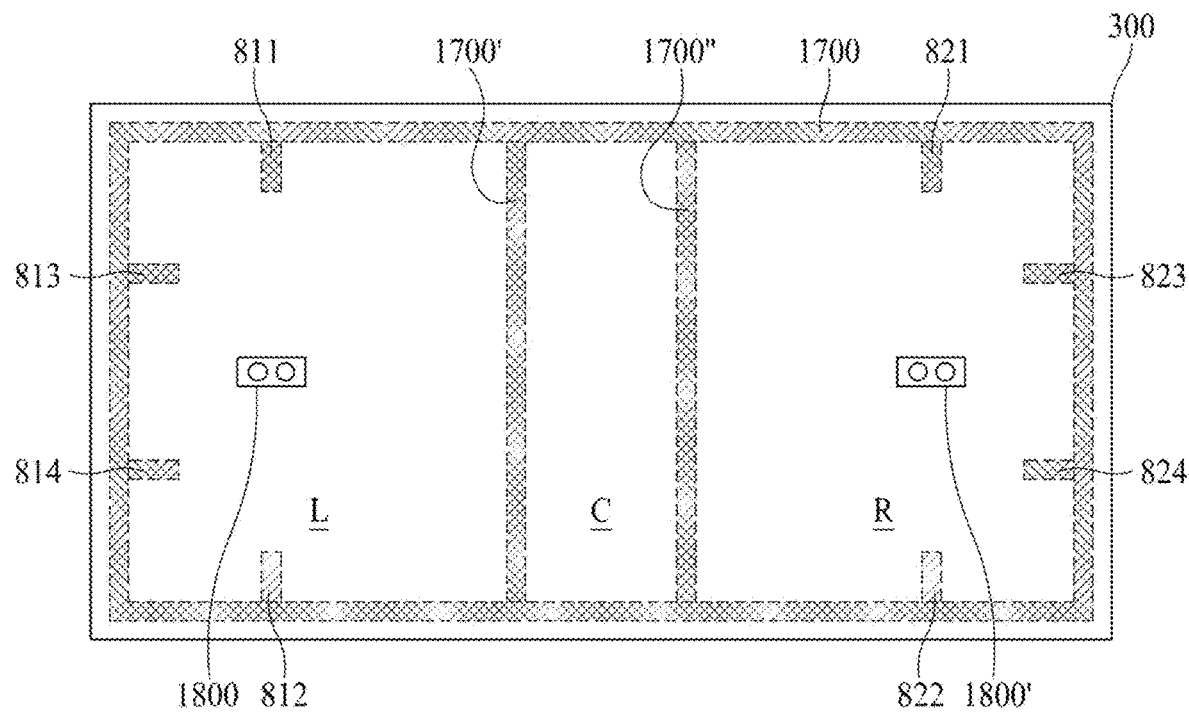
FIGS. 13A to 13C illustrate of a sound generating device and a partition according to another embodiment of the present disclosure.
Figure 13B:
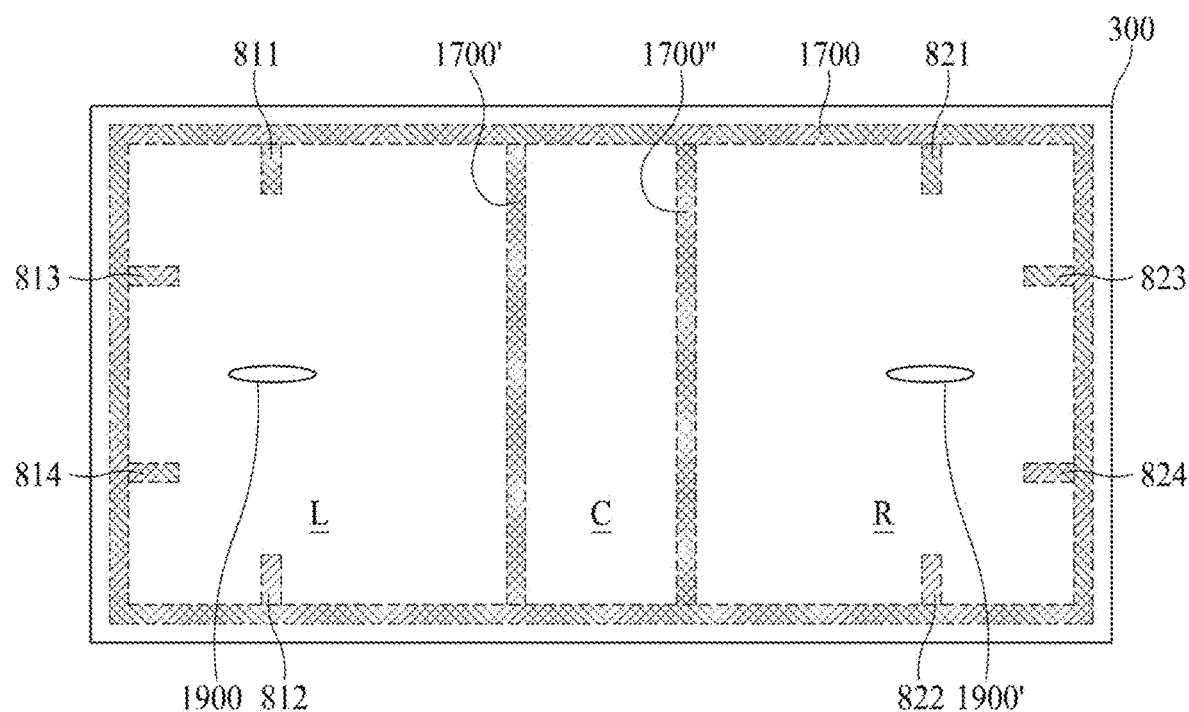
Figure 13C:
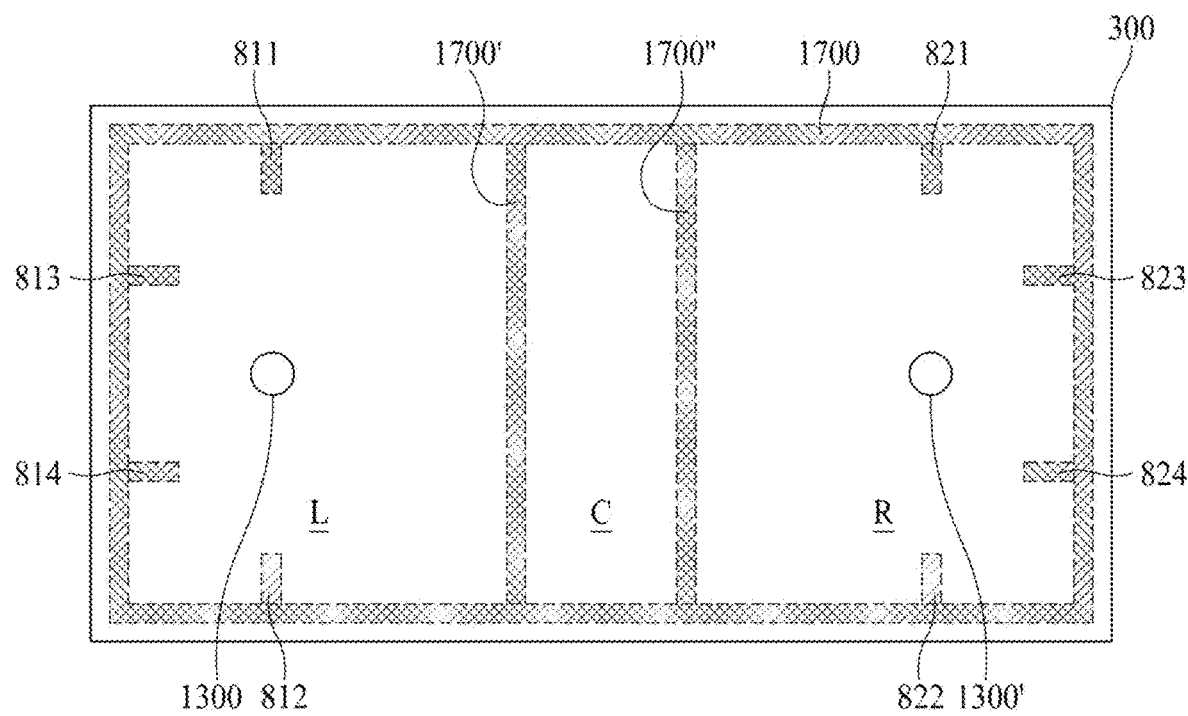

FIGS. 13A to 13C illustrate a sound generating device and a partition according to another embodiment of the present disclosure.

With reference to FIGS. 13A to 13C, a display panel 100 may include a first region L, a second region R, and a third region C. The first region L may be a left region of a rear surface of the display panel 100, the second region R may be a right region of the rear surface of the display panel 100, and the third region C may be a central region of the rear surface of the display panel 100. At least one or more sound generating device may be in at least one of the first region L, the second region R, and the third region C. The at least one sound generating device may include one or more of a circular sound generating device, an oval sound generating device, and a pair of sound generating devices. The oval shape may include an elliptical shape, a rectangular shape with rounded corners, or non-circular curved shape having a width different from its height, but is not limited thereto. The at least one sound generating device may vibrate the display panel 100 to generate sound. For example, the at least one sound generating device may directly vibrate the display panel 100 to generate sound.

With reference to FIGS. 13A to 13C, a first sound generating device 1800 and a second sound generating device 1800' may be respectively in the first region L and the second region R of the display panel 100. The first sound generating device 1800 may be in the first region L of a rear surface of the display panel 100, and the second sound generating device 1800' may be in the second region R of the rear surface of the display panel 100. As described above with reference to FIGS. 7 and 8, the first sound generating device 1800 and the second sound generating device 1800' may be coupled or connected to a supporting member 300, and may be between the display panel 100 and the supporting member 300.

Therefore, the first sound generating device 1800 may be in the first region L, which may be the left region of the rear surface of the display panel 100 and may vibrate the first region L of the display panel 100, and the second sound generating device 1800' may be in the second region R, which may be the right region of the rear surface of the display panel 100 and may vibrate the second region R of the display panel 100. The first sound generating device 1800 and the second sound generating device 1800' may receive different vibration signals and may be independently driven. For example, the first sound generating device 1800 may generate sound using the first region L of the display panel 100 as a vibration plate, and the second sound generating device 1800' may generate sound using the second region R of the display panel 100 as a vibration plate. For example, the first sound generating device 1800 and the second sound generating device 1800' may directly vibrate the display panel 100 to generate sound. Such descriptions may be identically or similarly applied to FIGS. 13B to 17C.

In FIG. 13A, a first sound generating device 1800 and a second sound generating device 1800' may be configured as a pair of sound generating devices. Descriptions of the pair of sound generating devices are the same as descriptions given above with reference to FIGS. 5A and 6, and thus, are omitted. Description given above with reference to FIGS. 5B to 8 may be identically applied to a coupling or connection structure of the first and second sound generating devices 1800 and 1800' and a supporting member.

In FIG. 13B, a first sound generating device 1900 and a second sound generating device 1900' may each be configured as an oval sound generating device. The sound generating device described above with reference to FIGS. 1 and 2 may be applied to the oval sound generating device, and a bobbin may be configured in an oval shape. The oval shape may have an elliptical shape, a rectangular shape with rounded corners, or non-circular curved shape having a width different from its height, but is not limited thereto. When the oval sound generating device is applied, a sound output characteristic of a middle to high pitched sound band may be enhanced. Description given above with reference to FIGS. 7 and 8 may be identically applied to a coupling or connection structure of the first and second sound generating devices 1900 and 1900' and a supporting member.

In FIG. 13C, a first sound generating device 1300 and a second sound generating device 1300' may be configured as a circular sound generating device. The sound generating device described above with reference to FIGS. 1 and 2 may be applied to the circular sound generating device. Description given above with reference to FIGS. 7 and 8 may be applied to a coupling or connection structure of the first and second sound generating devices 1300 and 1300' and a supporting member.

A partition and a pad will be described below with reference to FIG. 13A, and their descriptions may be identically applied to FIGS. 13B and 13C.

With reference to FIGS. 13A to 13C, a first partition 1700 may be between a display panel and a supporting member 300. For example, the first partition 1700 may be between a rear surface of the display panel and an upper surface of the supporting member 300. Also, the first partition 1700 may be on the supporting member 300. For example, the first partition 1700 may be disposed in an edge or periphery of the supporting member 300, or an edge or periphery of an upper surface of the supporting member 300. Also, the first partition 1700 may be in an edge or periphery of the display panel. For example, the first partition 1700 may be in an edge or periphery of the rear surface of the display panel. Also, the first partition 1700 may be in a whole region of the rear surface of the display panel or the supporting member 300. Also, the first partition 1700 may be in a whole region of four outer sides of the supporting member 300 or the whole region of the rear surface of the display panel.

With reference to FIG. 13A, at least two partitions (for example, a second partition 1700' and a third partition 1700") may be between a first sound generating device 1800 and a second sound generating device 1800'. For example, the second partition 1700' may be between a first region L and a third region C, and the third partition 1700" may be between a second region R and the third region C.

The first partition 1700, the second partition 1700' and the third partition 1700" may each be an air gap or a space where a sound is generated when the display panel 100 vibrates. An air gap or a space that may generate or transfer sound may be referred to as a "partition." A partition may be referred to as an "enclosure" or a "baffle," but the term is not limited thereto. Also, the first partition 1700, the second partition 1700' and the third partition 1700" may each be provided as a sealed structure, or may each be provided as an unsealed structure.

The first partition 1700, the second partition 1700', and the third partition 1700" may prevent a sound from being leaked to the outside through each side surface of a display panel 100. Thus, the sound may be output to only toward a forward region in front of the display panel 100, thereby enhancing a sound output characteristic.

The first partition 1700, the second partition 1700', and the third partition 1700" may be between the display panel 100 and the supporting member 300. For example, the first partition 1700, the second partition 1700', and the third partition 1700" may be between a rear surface of the display panel 100 and an upper surface of the supporting member 300. The first partition 1700, the second partition 1700', and the third partition 1700" may be in the supporting member 300. For example, the first partition 1700, the second partition 1700', and the third partition 1700" may be on the upper surface of the supporting member 300. The first partition 1700, the second partition 1700', and the third partition 1700" may be in the display panel 100. For example, the first partition 1700, the second partition 1700', and the third partition 1700" may be on the rear surface of the display panel 100. In FIGS. 13A to 17C, an example in which the first partition 1700, the second partition 1700', and the third partition 1700" are disposed on the supporting member 300 will be described.

The second partition 1700' and the third partition 1700" may separate a left sound and a right sound respectively generated by the first sound generating device 1800 of the first region L and the second sound generating device 1800' of the second region R. Also, a vibration of the display panel 100 performed in a space or an air gap defined as the second partition 1700' and the third partition 1700" may be attenuated or absorbed by a center of the display panel 100. Thus, a sound generated in the first region L may be reduced or prevented from being transferred to a space of the second region R. Therefore, when the second partition 1700' and the third partition 1700" are provided, the left sound and the right sound may be separated from each other, and thus, a sound output characteristic may be enhanced. Also, the first sound generating device 1800 and the second sound generating device 1800' may output a sound of a middle-pitched sound band and a sound of a high-pitched sound band and may output a stereo sound by separating the left and right sounds, thereby providing a display apparatus having a two-channel sound output characteristic. Here, the middle-pitched sound band may be 200 Hz to 3 kHz, the high-pitched sound band may be 3 kHz or more, and a low-pitched sound band may be 200 Hz or less. However, the present embodiment is not limited thereto.

A partition having a double structure, including two or more partitions may be between the first sound generating device 1800 and the second sound generating device 1800'. For example, a left region and a right region of a display panel may have the same vibration characteristic when realizing a mono sound in which the left and right regions output the same sound. Thus, a resonance phenomenon or an interference phenomenon may be increased or maximized in a certain frequency band, causing the reduction in sound pressure. Therefore, the partition may be configured in a structure including two or more partitions, for decreasing an influence of a sound characteristic caused by a resonance frequency difference of a middle-high-pitched sound that may occur in the first sound generating device provided in the first region L (e.g., the left region) and the second sound generating device provided in the second region R (e,g,m the right region). When three or more partitions are provided between the first sound generating device 1800 and the second sound generating device 1800', a sound pressure may be avoided or prevented from being reduced even when sound interference in the left and right regions increases, thereby reducing or preventing a sound output characteristic from being discontinuously recognized.

Therefore, two or more partitions may be in a central region of a display panel, thereby decreasing an influence of a sound characteristic caused by a resonance frequency difference between a middle-pitched sound and a high-pitched sound in a left region and a right region of the display panel. Also, a partition may be between two sound generating devices, and thus, a left sound and a right sound may be separated from each other, thereby enhancing a stereo characteristic of a sound. Also, a sound of the middle-pitched sound band and a sound of the high-pitched sound band may be output by the two sound generating devices.

The first sound generating device 1800 may be in the first region L, which may be the left region, the second sound generating device 1800' may be in the second region R, which may be the right region, and a sound generating device may not be in a third region C, which may be a central region. Accordingly, the degradation in sound quality caused by interference in the first region L and the second region R may be reduced. Also, a sound characteristic corresponding to each of the low-pitched sound band, middle-pitched sound band, and high-pitched sound band may be more enhanced. Also, an area of the third region C may be adjusted to be less than each of an area of the first region L and an area of the second region R. Accordingly, a sound of the low sound band may be enhanced. Also, the third region C may decrease the degradation in sound quality caused by interference in the first region L and the second region R. Accordingly, a sound of each of the low-pitched sound band, middle-pitched sound band, and high-pitched sound band may be enhanced. Descriptions of the first partition 1700, the second partition 1700', and the third partition 1700" may be identically applied to FIGS. 13B to 17C.

In FIGS. 13A to 17C, the first partition 1700 may be the adhesive member described above with reference to FIG. 1. Also, the adhesive member for attaching the supporting member on the display panel may be further provided between the display panel and the supporting member each described above with reference to FIG. 1. For example, the adhesive member may be further provided in an edge or periphery of the display panel or an edge of the supporting member.

FIGS. 13A to 15C illustrate an example where the sound generating device is leaned to the left region or the right region without being disposed in a center of the left region (the first region L) or the right region (the second region R) of the display panel 100, but embodiments are not limited thereto. In other embodiments, the sound generating device may be in the center of the left region (the first region L) or the right region (the second region R) of the display panel 100. Alternatively, the sound generating device may be asymmetrically in the first region L and the second region R of the display panel 100. A stereo sound characteristic may be more enhanced in a case, where the sound generating device leans to the left region or the right region, than a case where the sound generating device is in the center of the left region (the first region L) or the right region (the second region R) of the display panel 100.

As described above with reference to FIGS. 9A to 12B, the bent portion may be in the first partition 1700 so as to decrease a peak and dipping which are caused by a standing wave occurring in a lengthwise direction of each of the first and second sound generating devices 1800 and 1800'. Here, the peak may be a phenomenon where a sound pressure bounces in a specific frequency, and the dipping may be a phenomenon where generating of a specific frequency is suppressed, and thus, a low sound pressure is generated. A sound output characteristic of the display apparatus is reduced by the peak or the dip. Also, the present inventors have recognized that the first partition 1700 should be configured in another shape, for decreasing a wave phenomenon caused by the bent portion. Therefore, the present inventors have recognized that the first partition 1700 should be disposed based on a shape of the display panel 100 without the bent portion, e.g., for decreasing the wave phenomenon.

Therefore, the first partition 1700 may be disposed along a shape of the display panel 100. For example, the first partition 1700 may have a tetragonal (e.g., quadrilateral)

shape, but is not limited thereto. For example, a shape of the first partition 1700 may be modified based on a shape of the display panel 100. If the display panel 100 is a curved display panel having a curved shape or the like, the first partition 1700 may have a curved shape or the like. Accordingly, the first partition 1700 may be disposed along a shape of the display panel 100, and thus, a degree to which the display panel 100 may be pulled may be reduced in a process of attaching the supporting member to the display panel 100, thereby preventing the wave phenomenon.

However, if the partition is configured as the first partition 1700, it may be unable to control the peak and the dipping caused by the standing wave. Thus, the present inventors have recognized that the first partition 1700 should have a structure for controlling the peak and the dipping caused by the standing wave. The structure may be configured to reduce or prevent the wave phenomenon and to enable the peak and the dipping caused by the standing wave to be easily controlled. The structure may be not implemented through a simple procedure but has been implemented through various experiments.

Therefore, at least one pad may be provided on at least one side of the first partition 1700, e.g., for decreasing the peak and the dipping caused by the standing wave. For example, the first partition 1700 may include a first side and a second side vertical to the first side, and at least one first pad 811 may be provided on the first side. At least one second pad 812 may face the at least one first pad 811. The at least one first pad 811 and the at least one second pad 812 may be in the first region L. Each of the first pad 811 and the second pad 812 may be provided as one or as a plurality. The first side may be a widthwise direction of the display panel 100 or the supporting member 300, and the second side may be a lengthwise direction of the display panel 100 or the supporting member 300. The widthwise direction and the lengthwise direction may be used in common.

At least one seventh pad 821 and at least one eighth pad 822 may be in the second region R. The at least one eighth pad 822 may face the at least one seventh pad 821. The seventh pad 821 and the eighth pad 822 may each be provided as one or as a plurality.

The at least one first pad 811 and the at least one second pad 812 may face the first sound generating device 1800. The at least one seventh pad 821 and the at least one eighth pad 822 may face the second sound generating device 1800'. For example, the first pad 811 and the second pad 812 may be in the first region L to face the first sound generating device 1800, and the seventh pad 821 and the eighth pad 822 may be d in the second region R to face the second sound generating device 1800'. Therefore, the pads 811, 812, 821, and 822 may decrease the peak or the dipping caused by the standing wave which occurs in a lengthwise direction of each of the first sound generating device 1800 and the second sound generating device 1800' and may allow a vibration to laterally transferred, thereby enhancing a sound output characteristic.

A shape of each of the pads 811, 812, 821, and 822 may be configured to reduce or prevent the wave phenomenon from occurring when the display panel 100 is pulled in a process of attaching a pad, disposed on the supporting member, on the display panel 100. Alternatively, a shape of each of the pads 811, 812, 821, and 822 may be configured to reduce or prevent the wave phenomenon from occurring when the display panel 100 is pulled in a process of attaching the pad, disposed on the display panel 100, on the supporting member. Therefore, the present inventors have performed various experiments on shapes of the pads 811, 812, 821, and 822 so as to reduce the wave phenomenon which occurs when the bent portion is configured as described above with reference to FIGS. 9A to 12B, for decreasing the peak or the dip caused by the standing wave. For example, an example where a partition is disposed on a supporting member will be described, and even when the partition is disposed on a rear surface of the display panel, a wave phenomenon may occur. Therefore, the partition may be disposed on the rear surface of the display panel or an upper surface of the supporting member and may be disposed between the rear surface of the display panel or the upper surface of the supporting member, but is not limited thereto. Accordingly, the shape of each of the pads may be not modified through a simple procedure but has been modified through various experiments. For example, the shape of each of the pads should be implemented to reduce or prevent the wave phenomenon and to enable the peak and the dip caused by the standing wave to be easily controlled. The pads have been implemented in a tetragonal (e.g., quadrilateral) shape or an end-rounded tetragonal (e.g., quadrilateral) shape through various experiments.

At least one third pad 813 and at least one fourth pad 814 may be further provided on a second side of the first partition 1700. The at least one third pad 813 and the at least one fourth pad 814 may be in the first region L. For example, the third pad 813 and the fourth pad 814 may each be provided as one or as a plurality on one or more sides of the first partition 1700. The at least one third pad 813 and the at least one fourth pad 814 may face the first sound generating device 1800. The third pad 813 and the fourth pad 814 may be disposed symmetrically with respect to the first sound generating device 1800. Also, at least one ninth pad 823 and at least one tenth pad 824 may be further provided on the second side of the first partition 1700. The at least one ninth pad 823 and the at least one tenth pad 824 may be in the second region R. For example, the ninth pad 823 and the tenth pad 824 may each be provided as one or as a plurality on one or more sides of the first partition 1700. The at least one ninth pad 823 and the at least one tenth pad 824 may face the second sound generating device 1800'. The ninth pad 823 and the tenth pad 824 may be disposed symmetrically with respect to the second sound generating device 1800'. The pads 813, 814, 823, and 824 may further decrease a peak or dipping caused by a standing wave generated by interference between a reflected wave and a progressive wave, and may reduce or prevent sound quality from being degraded by the standing wave or the reflected wave. For example, the third pad 813 and the fourth pad 814 may be on a second side of the first partition 1700 of the first region L, and the ninth pad 823 and the tenth pad 824 may be disposed on a second side of the first partition 1700 of the second region R. In FIG. 13A, each of the pads 813, 814, 823, and 824 may be provided as one or as a plurality on one of a first side and a second side vertical among four sides of the display panel 100, but is not limited thereto and may be provided as two or more.

Even when the first partition 1700 is not disposed closest to an edge or periphery of the rear surface of the display panel 100 or an edge or periphery of the upper surface of the supporting member, a wave phenomenon seen on a screen of the display panel 100 may be reduced. Accordingly, a desired sound may be output. Also, the first partition 1700 may be configured based on the shape of the display panel 100, and thus, workability may be improved in a process of attaching the display panel 100 on the supporting member which supports the rear surface of the display panel 100.

Various experiments have been performed so that the first to fourth pads 811, 812, 813, and 814 and the seventh to tenth pads 821, 822, 823, and 824 are formed of materials for decreasing a degree to which the display panel 100 is pulled in a process of attaching the supporting member 300 on the display panel 100. The present inventors have recognized that the pads 811, 812, 813, 814, 821, 822, 823, and 824 in the first partition 1700 should be formed of materials for decreasing a degree to which the display panel 100 is pulled in a process of contacting the display panel 100. Therefore, the present inventors have performed various experiments on a material which prevents the wave phenomenon and enables the peak or the dip caused by the standing wave to be controlled, instead of simply changing a material. The present inventors have recognized that the pad should be formed of materials which are the same as that of the first partition 1700, based on various experiments. When the pads are formed of materials which are the same as that of the first partition 1700, the inventors have recognized that the display panel is less pulled and a wave phenomenon caused by flatness or bending of the supporting member is reduced. A partition and a pad disposed in the supporting member are described with reference to FIGS. 13A to 17C, but without being limited thereto, the same description may also be applied to a case where the partition and the pad are disposed on the rear surface of the display panel 100.

At least one of the first partition 1700, the second partition 1700', and the third partition 1700" may be formed of the same material as that of the first pad 811. In one embodiment, the first partition 1700, the second partition 1700', and the third partition 1700" may each be formed of the same material as that of the first pad 811. The second partition 1700' and the third partition 1700" may each be formed of the same material as that of the first partition 1700. The first to fourth pads 811, 812, 813, and 814 and the seventh to tenth pads 821, 822, 823 and 824 may be formed of materials which are the same as that of the first partition 1700. Also, the second partition 1700' and the third partition 1700" may be in the first partition 1700, and thus, the first to fourth pads 811, 812, 813, and 814 may be formed of materials which are the same as those of the seventh to tenth pads 821, 822, 823, and 824.

The second pad 812 and the eighth pad 822 may be disposed in a lower end or a lower portion of the display panel 100, and thus, the present inventors have recognized that a wave phenomenon is strongly seen. For example, the inventors have recognized that, in the second pad 812 and the eighth pad 822, the wave phenomenon occurs more than the first pad 811, the third pad 813, and the fourth pad 814. Since the second pad 812 and the eighth pad 822 are disposed in a lower end or a lower portion of the display panel 100 or the supporting member 300, the inventors have recognized that, in the second pad 812 and the eighth pad 822, the wave phenomenon is more strongly seen than the first pad 811, the third pad 813, the fourth pad 814, the seventh pad 821, the ninth pad 823, and the tenth pad 824 each disposed in an upper portion or a side surface of the display panel 100 or the supporting member 300. Therefore, the present inventors have recognized that the second pad 812 or the eighth pad 822 should be formed of a material differing from that of the first partition 1700. The second pad 812 or the eighth pad 822 may be formed of a material differing from that of the first partition 1700. The second pad 812 or the eighth pad 822 may be formed of a material differing from that of at least one of the second partition 1700' and the third partition 1700". For example, the first partition 1700 may be formed of a double-sided tape, and the second pad 812 may be formed of a single-sided tape. The eighth pad 822 may be formed of the same material as that of the second pad 812. The at least one first pad 811 may be formed of the same material as that of the first partition 1700. For example, the at least one first pad 811 and the first partition 1700 may each be formed of a double-sided tape. The at least one first pad 811 and the at least one third pad 813 or the at least one fourth pad 814 may be formed of the same material as that of at least one of the first partition 1700, the second partition 1700', and the third partition 1700". The at least one third pad 813 or the at least one fourth pad 814 may be formed of the same material as that of at least one of the first partition 1700, the second partition 1700', and the third partition 1700". The at least one third pad 813 or the at least one fourth pad 814 may be formed of the same material as that of the first partition 1700. For example, the at least one third pad 813 or the at least one fourth pad 814 and the first partition 1700 may be formed of a double-sided tape. The at least one seventh pad 821 may be formed of the same material as that of the first partition 1700. For example, the at least one seventh pad 821 and the first partition 1700 may be formed of a double-sided tape. The at least one seventh pad 821 and the at least one ninth pad 823 or the at least one tenth pad 824 may be formed of the same material as that of at least one of the first partition 1700, the second partition 1700', and the third partition 1700". The at least one ninth pad 823 or the at least one tenth pad 824 may be formed of the same material as that of at least one of the first partition 1700, the second partition 1700', and the third partition 1700". The at least one ninth pad 823 or the at least one tenth pad 824 may be formed of the same material as that of the first partition 1700. For example, the at least one ninth pad 823 or the at least one tenth pad 824 and the first partition 1700 may be formed of a double-sided tape.

Therefore, since one or more pads are provided on at least one side of a partition, the wave phenomenon may decrease, and the peak or the dipping caused by the standing wave may be reduced, thereby enhancing a sound output characteristic.

In FIG. 13A, a pair of sound generating devices have been described above for example, and the description of FIG. 13A may be identically applied to a circular sound generating device and an oval sound generating device. The oval shape may include an elliptical shape, a rectangular shape with rounded corners, or non-circular curved shape having a width different from its height, but is not limited thereto. The description of FIG. 13A may be identically applied to FIGS. 13B to 17C.

In FIGS. 13A to 13C, a pad may be configured in a tetragonal (e.g., quadrilateral) shape. In this case, the present inventors have recognized that a vibration does not uniformly spread due to a tetragonal (e.g., quadrilateral) shape, and thus, a standing wave is not controlled. Therefore, through various experiments, the present inventors have invented a display apparatus having a new structure, in which the standing wave may be controlled. This will be described below with reference to FIGS. 14A to 17C.

Figure 14A:
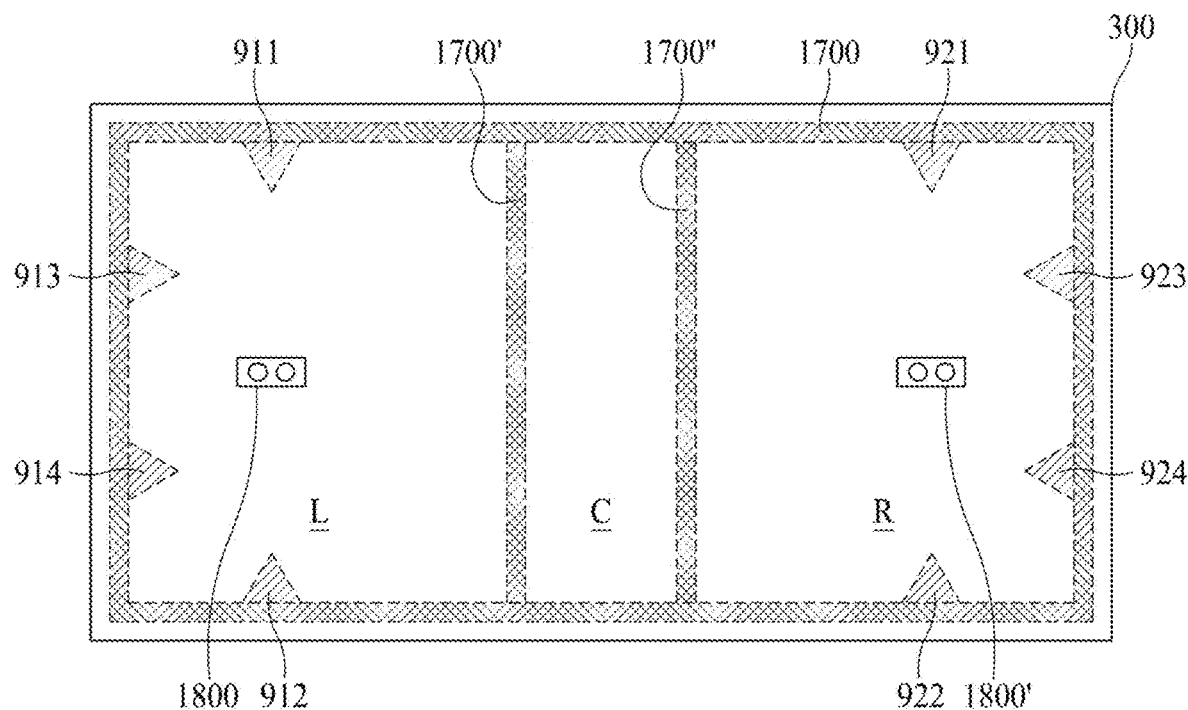
FIGS. 14A to 14C illustrate a sound generating device and a partition according to another embodiment of the present disclosure.
Figure 14B:
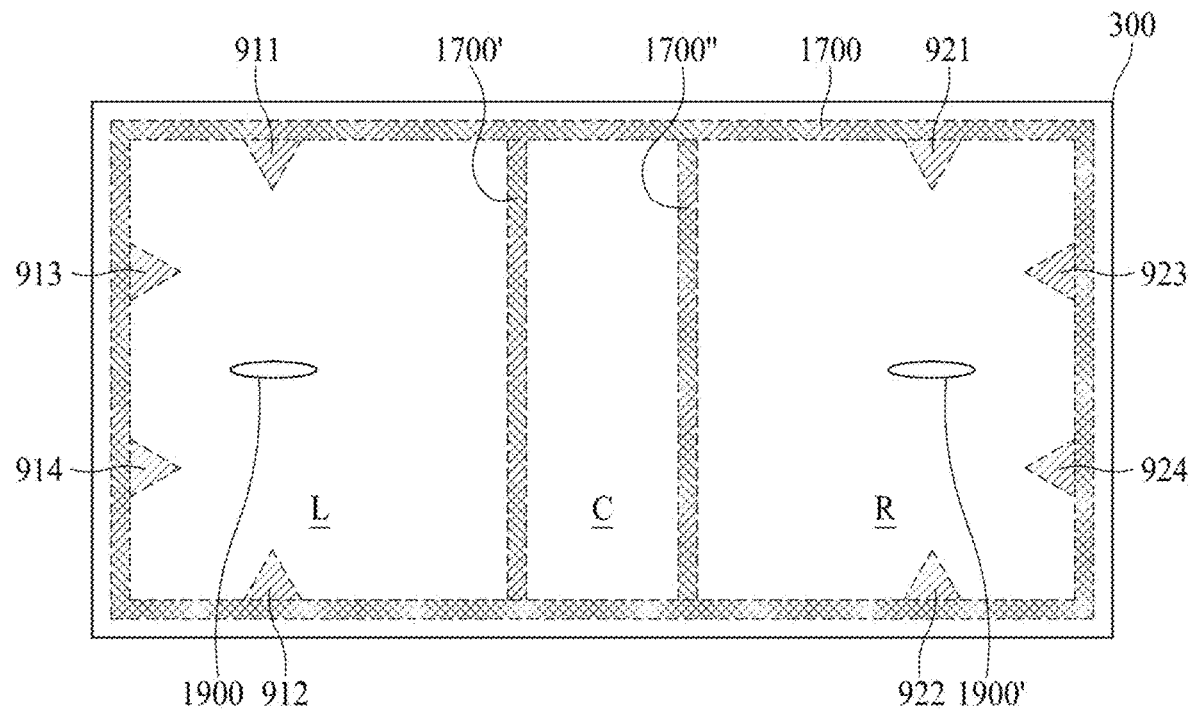
Figure 14C:
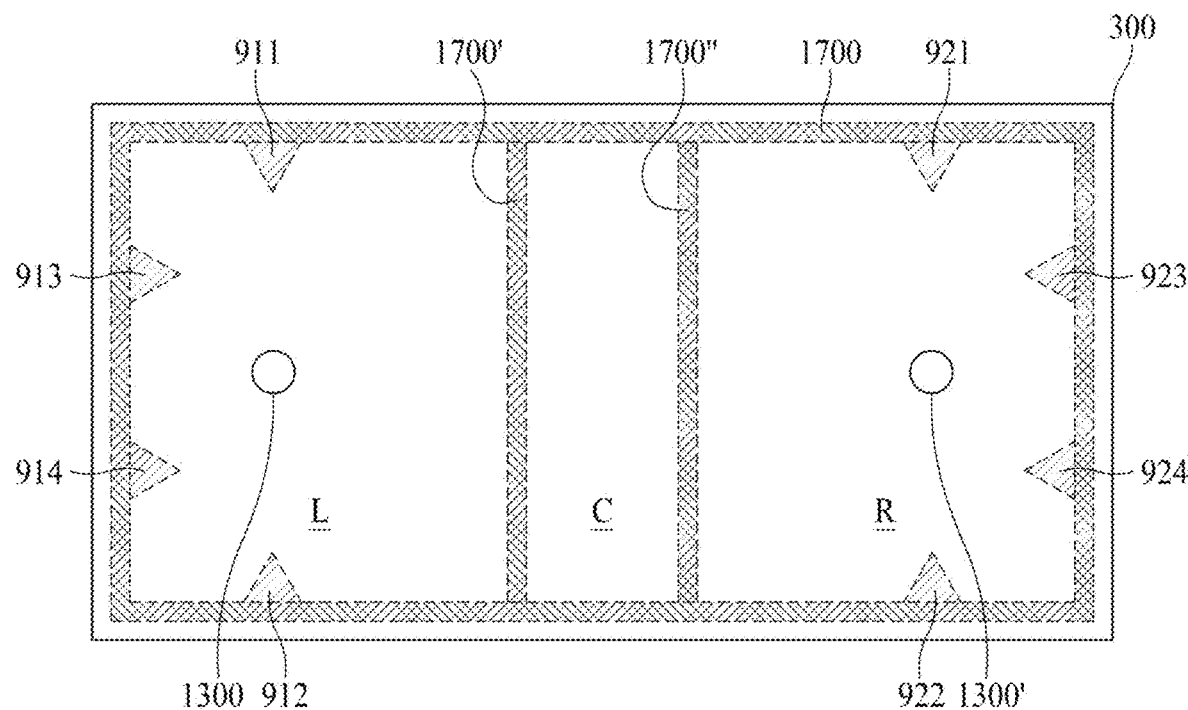

FIGS. 14A to 14C illustrate a sound generating device and a partition according to another embodiment of the present disclosure.

In FIGS. 14A to 14C, the same descriptions as descriptions given above with reference to FIGS. 13A to 13C are omitted or will be briefly given below. For example, description of a sound generating device is omitted or will be briefly given below. A partition and a pad will be described below with reference to FIG. 14A, and their descriptions may be identically applied to FIGS. 14B and 14C.

With reference to FIG. 14A, at least one pad may be provided in at least one side of a first partition 1700 so as to decrease a peak and dipping which are caused by a standing wave occurring in a lengthwise direction of each of first and second sound generating devices 1800 and 1800'. For example, the first partition 1700 may include a first side and a second side vertical to the first side, and a first pad 911 and a seventh pad 921 may be on the first side. Each of the first pad 911 and the seventh pad 921 may be provided as one or as a plurality. The first side may be a widthwise direction of the display panel 100 or the supporting member 300, and the second side may be a lengthwise direction of a display panel 100 or a supporting member 300.

A third pad 913, a fourth pad 914, a ninth pad 923, and a tenth pad 924 may be further provided in the second side of the first partition 1700. Each of the third pad 913, the fourth pad 914, the ninth pad 923, and the tenth pad 924 may be provided as one or more in one or more sides of the first partition 1700. The third pad 913, the fourth pad 914, the ninth pad 923, and the tenth pad 924 may be disposed in at least one of a first region L and a second region R. For example, the third pad 913 and the fourth pad 914 may be disposed in the first region L, and the ninth pad 923 and the tenth pad 924 may be disposed in the second region R. For example, the third pad 913 and the fourth pad 914 may be disposed to be symmetrical with respect to the first sound generating device 1800, and the ninth pad 923 and the tenth pad 924 may be disposed to be symmetrical with respect to the second sound generating device 1800'.

At least one or more pads may face one or more sound generating devices. For example, a second pad 912 and an eighth pad 922 may be further provided in a side facing the first side of the first partition 1700. The second pad 912 may be disposed in a side, facing the first side of the first partition 1700, of the first region L, and the eighth pad 922 may be disposed in a side, facing the first side of the first partition 1700, of the second region R. The second pad 912 may face the first pad 911, and the eighth pad 922 may face the seventh pad 921. Each of the second pad 912 and the eighth pad 922 may be provided as at least one or as a plurality.

The first partition 1700 may be formed of a double-sided tape. In comparison with a single-sided tape, the inventors have recognized that, when the first partition 1700 is formed of the double-sided tape, the wave phenomenon is not reduced, but an adhesive force between the display panel and the supporting member is enhanced and sound quality is enhanced. Therefore, the first partition 1700 may be formed of the double-sided tape or a double-sided foam pad. The double-sided tape or the double-sided foam pad may include a foam material which absorbs an impact when contacting the display panel 100. When the double-sided tape or the double-sided foam pad does not include the foam material, an undesired abnormal sound may occur due to contacting the display panel 100. For example, the first partition 1700 may be formed of a material having elasticity which enables compression to be made to a certain degree. The first partition 1700 may be formed of polyurethane, polyolefin, polyethylene, and/or the like, but is not limited thereto.

One of a second partition 1700' and a third partition 1700" may be formed of the same material as that of the first partition 1700. For example, the second partition 1700' or the third partition 1700" may be formed of a double-sided tape or a double-sided foam pad. The double-sided tape or the double-sided foam pad may include a foam material which absorbs an impact when contacting the display panel 100. When the double-sided tape or the double-sided foam pad does not include the foam material, an undesired abnormal sound may occur due to contacting the display panel 100. For example, the first partition 1700 may be formed of a material having elasticity which enables compression to be made to a certain degree. The first partition 1700 may be formed of polyurethane, polyolefin, polyethylene, and/or the like, but is not limited thereto. The second partition 1700' and the third partition 1700" may be formed of the same material as that of the first partition 1700. When the second partition 1700' and the third partition 1700" are formed of the same material as that of the first partition 1700, an adhesive force may be enhanced in a process of attaching the display panel 100 on the supporting member 300.

When a pad is formed of the same material as that of the first partition 1700, the wave phenomenon may occur at a position at which the pad is disposed. The occurrence of the wave phenomenon has been recognized because, when an adhesive force of the first partition 1700 is the same as that of the pad, the display panel is more pulled at the position at which the pad is disposed. Therefore, at least one second pad 912 may be formed of a material differing from that of the first partition 1700. The at least one second pad 912 may be formed of a material differing from that of at least one of the first partition 1700, the second partition 1700', and the third partition 1700". At least one first pad 911 and the at least one second pad 912 may be formed of a material differing from that of at least one of the first partition 1700, the second partition 1700', and the third partition 1700". The at least one first pad 911 may be formed of the same material as that of the at least one second pad 912. At least one third pad 913 or at least one fourth pad 914 may be formed of the same material as that of the at least one second pad 912. The at least one third pad 913 or at least one fourth pad 914 may be formed of a material differing from that of the first partition 1700. The at least one third pad 913 or at least one fourth pad 914 may be formed of a material differing from that of at least one of the first partition 1700, the second partition 1700', and the third partition 1700".

At least one eighth pad 922 may be formed of a material differing from that of the first partition 1700. The at least one eighth pad 922 may be formed of a material differing from that of at least one of the first partition 1700, the second partition 1700', and the third partition 1700". At least one seventh pad 921 and the at least one eighth pad 922 may be formed of a material differing from that of at least one of the first partition 1700, the second partition 1700', and the third partition 1700". The at least one seventh pad 921 may be formed of the same material as that of the at least one eighth pad 922. At least one ninth pad 923 or at least one tenth pad 924 may be formed of the same material as that of the at least one second pad 92. The at least one ninth pad 923 or at least one tenth pad 924 may be formed of the same material as that of the at least one eighth pad 922. The at least one ninth pad 923 or at least one tenth pad 924 may be formed of a material differing from that of the first partition 1700. The at least one ninth pad 923 or at least one tenth pad 924 may be formed of a material differing from that of at least one of the first partition 1700, the second partition 1700', and the third partition 1700". The at least one ninth pad 923 or at least one tenth pad 924 may be formed of the same material as that of the at least one eighth pad 922.

The first to fourth pads 911, 912, 913, and 914 and the seventh to tenth pads 921, 922, 923, and 924 may be formed of a material differing from that of the first partition 1700. The first to fourth pads 911, 912, 913, and 914 and the seventh to tenth pads 921, 922, 923, and 924 may be formed of a material differing from that of the second partition 1700' or the third partition 1700". For example, the first to fourth pads 911, 912, 913, and 914 and the seventh to tenth pads 921, 922, 923, and 924 may be formed of a single-sided tape. The single-sided tape may include a foam material which absorbs an impact when contacting the display panel 100. When the single-sided tape does not include the foam material, an undesired abnormal sound may occur due to contacting the display panel 100. For example, the single-sided tape may be formed of polyurethane, polyolefin, polyethylene, and/or the like, but is not limited thereto. When the first partition 1700, the first to fourth pads 911, 912, 913, and 914, and the seventh to tenth pads 921, 922, 923, and 924 are formed of different materials, the materials may be the same materials having different adhesive forces. Alternatively, the materials may differ and may have different adhesive forces, but are not limited thereto. In this case, a degree to which the display panel 100 is pulled may be reduced in a process of attaching the display panel 100 and the supporting member 300 on the first to fourth pads 911, 912, 913, and 914 and the seventh to tenth pads 921, 922, 923, and 924 each disposed in the first partition 1700, thereby reducing or preventing the wave phenomenon.

A shape of each of the first to fourth pads 911, 912, 913, and 914 and the seventh to tenth pads 921, 922, 923, and 924 may be configured as a shape which protrudes toward a sound generating device, and thus, may enable a standing wave to be controlled. Instead of simply changing the shape, the shape has been implemented through various experiments to decrease the wave phenomenon of the display panel and to enable the standing wave to be controlled. The shape of each of the first to fourth pads 911, 912, 913, and 914 and the seventh to tenth pads 921, 922, 923, and 924 may be implemented as a shape which protrudes toward the sound generating device, and for example, may include a triangular shape or a round triangular shape. The triangular shape may be one of an equilateral triangle, a scalene triangle, an isosceles triangle, and a right-angled triangle. Also, corners or ends of a triangular shape or a corners-rounded triangular shape of each of the first to fourth pads 911, 912, 913, and 914 and the seventh to tenth pads 921, 922, 923, and 924 may face the first and second sound generating devices 1800 and 1800'.

Therefore, since one or more pads are provided on at least one side of a partition and a shape of each of the pads is configured as a shape which protrudes toward a sound generating device, the wave phenomenon may more decrease, and the peak or the dipping caused by the standing wave may be more reduced, thereby more enhancing a sound output characteristic. Also, since the partition and the pads are formed of different materials, the wave phenomenon may decrease, and a desired sound may be output, thereby enhancing a sound output characteristic.

Figure 15A:
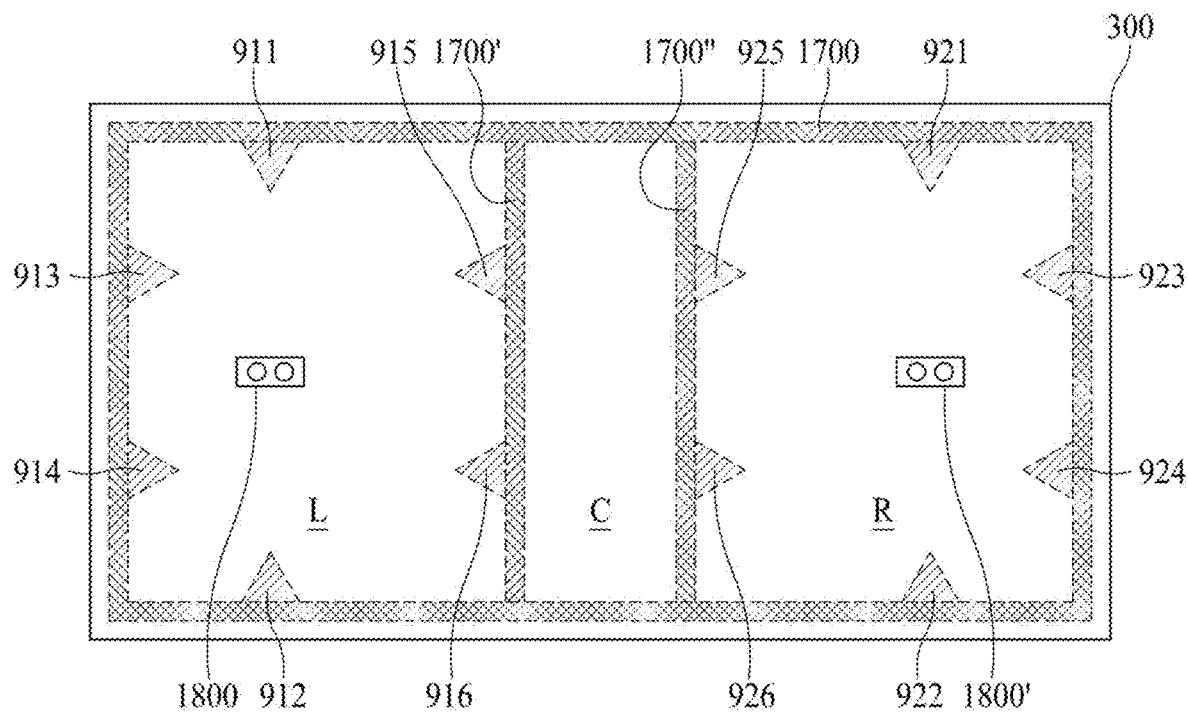
FIGS. 15A to 15C illustrate a sound generating device and a partition according to another embodiment of the present disclosure.
Figure 15B:
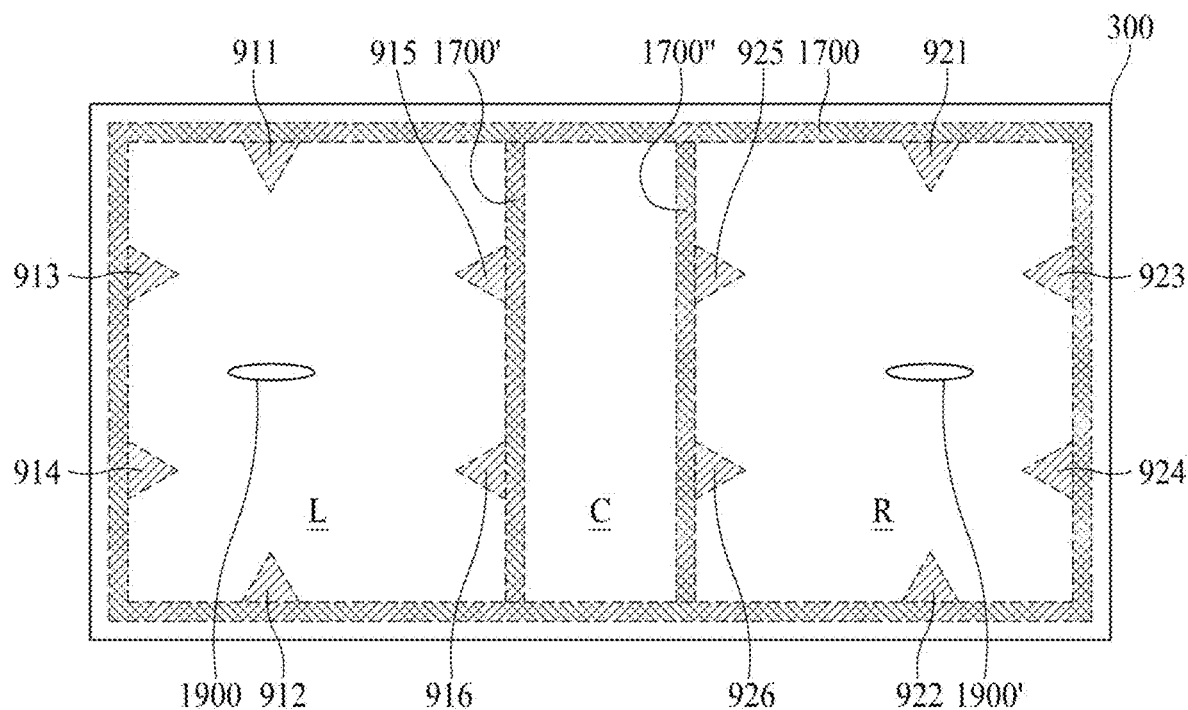
Figure 15C:
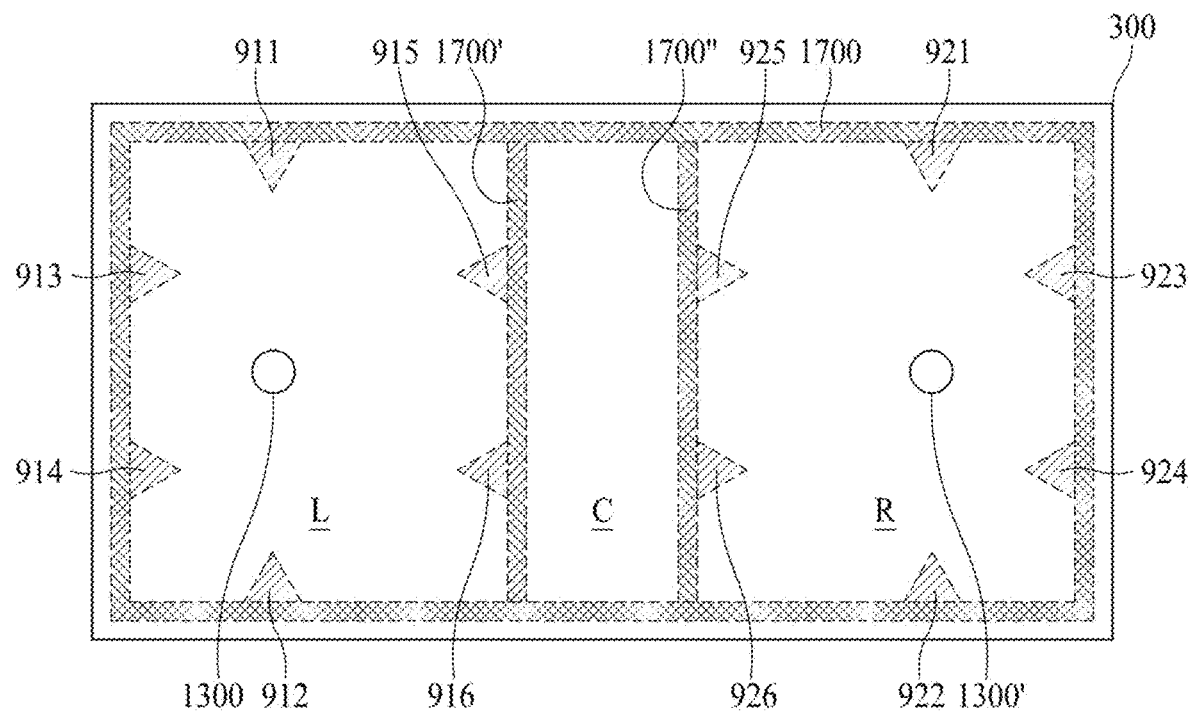

FIGS. 15A to 15C illustrate a sound generating device and a partition according to another embodiment of the present disclosure.

In FIGS. 15A to 15C, the same descriptions as descriptions given above with reference to FIGS. 13A to 14C are omitted or will be briefly given below. For example, description of a sound generating device is omitted or will be briefly given below. A partition and a pad will be described below with reference to FIG. 15A, and their descriptions may be identically applied to FIGS. 15B and 15C.

With reference to FIG. 15A, at least one pad may be provided in at least one side of a first partition 1700 so as to decrease a peak and dipping which are caused by a standing wave occurring in a lengthwise direction of each of first and second sound generating devices 1800 and 1800'. For example, the first partition 1700 may include a first side and a second side vertical to the first side, and a first pad 911 and a seventh pad 921 may be provided on the first side. Each of the first pad 911 and the seventh pad 921 may be provided as one or more. The first side may be a widthwise direction of the display panel 100 or the supporting member 300, and the second side may be a lengthwise direction of a display panel 100 or a supporting member 300.

A third pad 913, a fourth pad 914, a ninth pad 923, and a tenth pad 924 may be further provided in the second side of the first partition 1700. Each of the third pad 913, the fourth pad 914, the ninth pad 923, and the tenth pad 924 may be provided as one or more in one or more sides of the first partition 1700. The third pad 913, the fourth pad 914, the ninth pad 923, and the tenth pad 924 may be disposed in at least one of a first region L and a second region R. For example, the third pad 913 and the fourth pad 914 may be disposed in the first region L, and the ninth pad 923 and the tenth pad 924 may be disposed in the second region R. For example, the third pad 913 and the fourth pad 914 may be disposed to be symmetrical with respect to the first sound generating device 1800, and the ninth pad 923 and the tenth pad 924 may be disposed to be symmetrical with respect to the second sound generating device 1800'.

One or more pads may face one or more sound generating devices. For example, a second pad 912 and an eighth pad 922 may be further provided in a side facing the first side of the first partition 1700. The second pad 912 may be disposed in a side, facing the first side of the first partition 1700, of the first region L, and the eighth pad 922 may be disposed in a side, facing the first side of the first partition 1700, of the second region R. The second pad 912 may be provided to face the first pad 911, and the eighth pad 922 may be provided to face the seventh pad 921. Each of the second pad 912 and the eighth pad 922 may be provided as one or more.

At least one fifth pad 915, sixth pad 916, eleventh pad 925, and twelfth pad 926 may be further provided on a side facing the second side of the first partition 1700. For example, the fifth pad 915 and the sixth pad 916 may be disposed on a side, facing the second side of the first partition 1700, of the first region L and may be on one side of the second partition 1700'. For example, the eleventh pad 925 and the twelfth pad 926 may be disposed on a side, facing the second side of the first partition 1700, of the second region R and may be on one side of the third partition 1700". The fifth pad 915 and the sixth pad 916 may face the third pad 913 and the fourth pad 914. For example, the fifth pad 915 and the sixth pad 916 may be disposed to be symmetrical with respect to the first sound generating device 1800. The eleventh pad 925 and the twelfth pad 926 may face the ninth pad 923 and the tenth pad 924. For example, the eleventh pad 925 and the twelfth pad 926 may be disposed to be symmetrical with respect to the second sound generating device 1800'.

The at least one second pad 912 may be formed of a material differing from that of the first partition 1700. The at least one second pad 912 may be formed of a material differing from that of at least one of the first partition 1700, the second partition 1700', and the third partition 1700". The at least one first pad 911 and the at least one second pad 912 may be formed of a material differing from that of at least one of the first partition 1700, the second partition 1700', and the third partition 1700". The at least one first pad 911 may be formed of the same material as that of the at least one second pad 912. The at least one third pad 913 or the at least one fourth pad 914 may be formed of the same material as that of the at least one second pad 912. The at least one third pad 913 or the at least one fourth pad 914 may be formed of a material differing from that of the first partition 1700. The at least one third pad 913 or the at least one fourth pad 914 may be formed of a material differing from that of at least one of the first partition 1700, the second partition 1700', and the third partition 1700". The at least one fifth pad 915 or the at least one sixth pad 916 may be formed of the same material as that of the at least one second pad 912. The at least one fifth pad 915 or the at least one sixth pad 916 may be formed of a material differing from that of the first partition 1700. The at least one fifth pad 915 or the at least one sixth pad 916 may be formed of a material differing from that of at least one of the first partition 1700, the second partition 1700', and the third partition 1700".

At least one eighth pad 922 may be formed of a material differing from that of the first partition 1700. The at least one eighth pad 922 may be formed of a material differing from that of at least one of the first partition 1700, the second partition 1700', and the third partition 1700". At least one seventh pad 921 and the at least one eighth pad 922 may be formed of a material differing from that of at least one of the first partition 1700, the second partition 1700', and the third partition 1700". The at least one seventh pad 921 may be formed of the same material as that of the at least one eighth pad 922. At least one ninth pad 923 or at least one tenth pad 924 may be formed of the same material as that of the at least one second pad 92. The at least one ninth pad 923 or at least one tenth pad 924 may be formed of the same material as that of the at least one eighth pad 922. The at least one ninth pad 923 or at least one tenth pad 924 may be formed of a material differing from that of the first partition 1700. The at least one ninth pad 923 or at least one tenth pad 924 may be formed of a material differing from that of at least one of the first partition 1700, the second partition 1700', and the third partition 1700". The at least one ninth pad 923 or at least one tenth pad 924 may be formed of the same material as that of the at least one eighth pad 922. The at least one eleventh pad 925 or the at least one twelfth pad 926 may be formed of the same material as that of the at least one second pad 912. The at least one eleventh pad 925 or the at least one twelfth pad 926 may be formed of a material differing from that of the first partition 1700. The at least one eleventh pad 925 or the at least one twelfth pad 926 may be formed of a material differing from that of at least one of the first partition 1700, the second partition 1700', and the third partition 1700".

The first to sixth pads 911, 912, 913, 914, 915, and 916 and the seventh to twelfth pads 921, 922, 923, 924, 925, and 926 may be formed of a material differing from that of the first partition 1700. The first to sixth pads 911, 912, 913, 914, 915, and 916 and the seventh to twelfth pads 921, 922, 923, 924, 925, and 926 may be formed of a material differing from that of the second partition 1700' or the third partition 1700". For example, the first to sixth pads 911, 912, 913, 914, 915, and 916 and the seventh to twelfth pads 921, 922, 923, 924, 925, and 926 may be formed of a single-sided tape. The single-sided tape may include a foam material which absorbs an impact when contacting the display panel 100. When the single-sided tape does not include the foam material, an undesired abnormal sound may occur due to contacting the display panel 100. For example, the single-sided tape may be formed of polyurethane, polyolefin, polyethylene, and/or the like, but is not limited thereto. When the first partition 1700, the first to sixth pads 911, 912, 913, 914, 915, and 916 and the seventh to twelfth pads 921, 922, 923, 924, 925, and 926 are formed of different materials, the materials may be the same materials having different adhesive forces. Alternatively, the materials may differ and may have different adhesive forces, but are not limited thereto. In this case, a degree to which the display panel 100 is pulled may be reduced in a process of attaching the display panel 100 and the supporting member 300 on the first to sixth pads 911, 912, 913, 914, 915, and 916 and the seventh to twelfth pads 921, 922, 923, 924, 925, and 926 each disposed in the first partition 1700, thereby reducing or preventing the wave phenomenon.

Corners or ends of a triangular shape or a corners-rounded triangular shape of each of the first to sixth pads 911, 912, 913, 914, 915, and 916 and the seventh to twelfth pads 921, 922, 923, 924, 925, and 926 may face the first and second sound generating devices 1800 and 1800'. Therefore, the first to sixth pads 911, 912, 913, 914, 915, and 916 and the seventh to twelfth pads 921, 922, 923, 924, 925, and 926 may trap a reflected wave from each of the first and second sound generating devices 1800 and 1800', thereby reducing or decreasing a peak or dipping caused by a standing wave. The fifth pad 915, the sixth pad 916, the eleventh pad 925, and the twelfth pad 926 may more reduce the peak or the dipping each caused by interference between the reflected wave and a progressive wave and may better prevent sound quality from being degraded by the standing wave or the reflected wave. Also, the first to sixth pads 911, 912, 913, 914, 915, and 916 and the seventh to twelfth pads 921, 922, 923, 924, 925, and 926 may each be configured in a shape which protrudes toward a corresponding sound generating device, and thus, may more reduce or decrease the wave phenomenon and may more reduce the peak and the dipping each caused by the standing wave, thereby more enhancing a sound output characteristic.

Figure 16A:
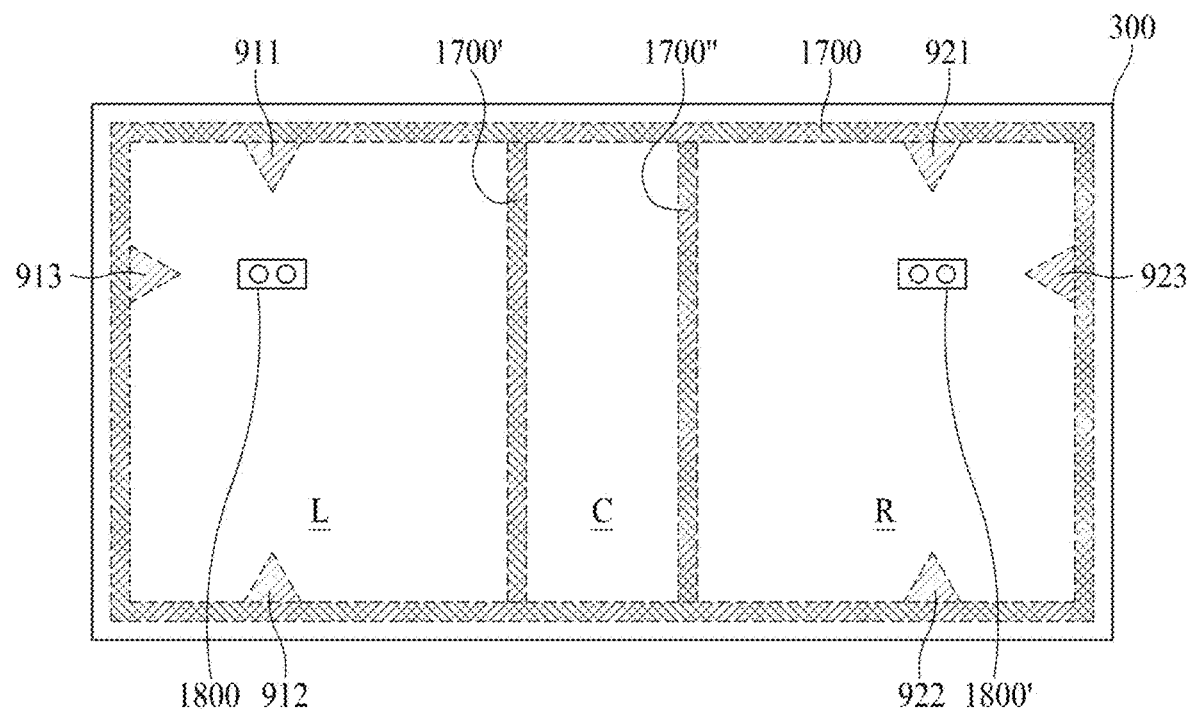
FIGS. 16A to 16C illustrate a sound generating device and a partition according to another embodiment of the present disclosure.
Figure 16B:
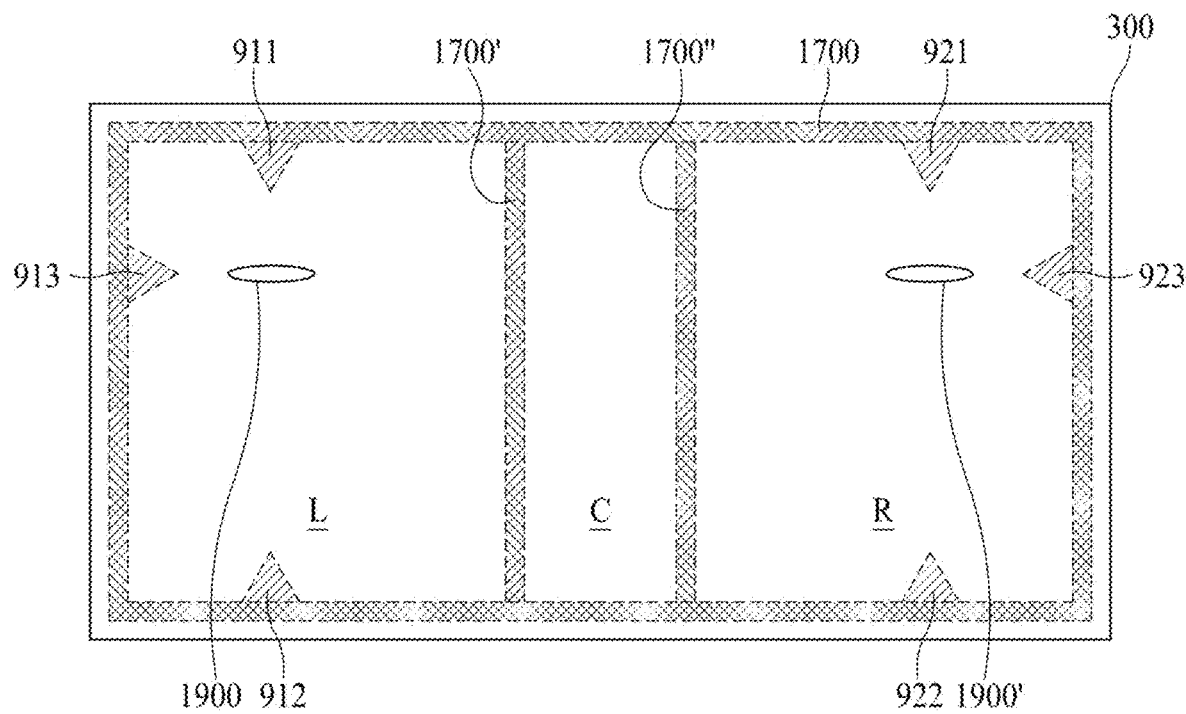
Figure 16C:
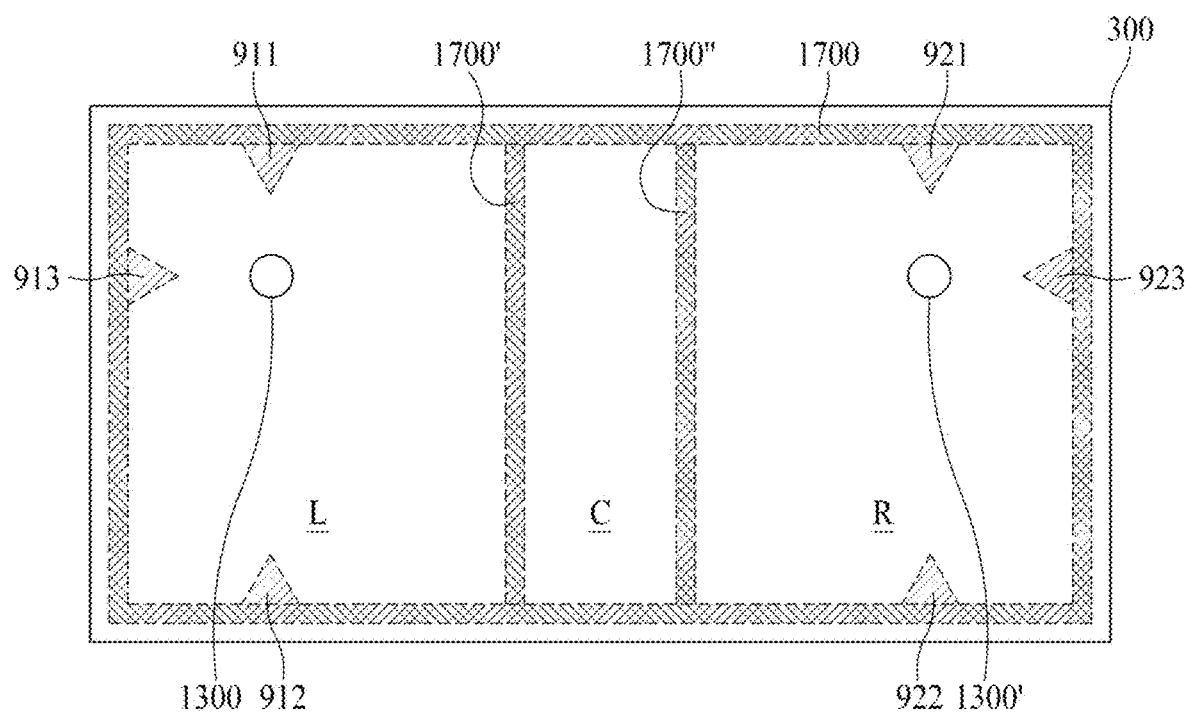

FIGS. 16A to 16C illustrate a sound generating device and a partition according to another embodiment of the present disclosure.

In FIGS. 16A to 16C, the same descriptions as descriptions given above with reference to FIGS. 13A to 15C are omitted or will be briefly given below. For example, description of a sound generating device is omitted or will be briefly given below. A partition and a pad will be described below with reference to FIG. 16A, and their descriptions may be identically applied to FIGS. 16B and 16C.

With reference to FIG. 16A, a first sound generating device 1800 and a second sound generating device 1800' may not be disposed in a center of a first region L or a second region R and may be in an upper portion of a display panel 100 or an upper portion of a supporting member 300. Such disposition may be changed based on a position of a rear cover on a rear surface of a display apparatus, and when a size of the rear cover is large, the first sound generating device 1800 and the second sound generating device 1800' may be in the upper portion of the supporting member 300 to be covered. In this case, first to third pads 911 to 913 and seventh to ninth pads 921 to 923 may be provided in at least one side of each of a first partition 1700, a second partition 1700', and a third partition 1700". The third pad 913 may be disposed to be symmetrical with the first sound generating device 1800, and the ninth pad 923 may be disposed to be symmetrical with the second sound generating device 1800'. The first to third pads 911 to 913 and the seventh to ninth pads 921 to 923 may face the first sound generating device 1800 and the second sound generating device 1800'. For example, corners or ends of a triangular shape or a corners-rounded triangular shape of each of the first to third pads 911 to 913 and the seventh to ninth pads 921 to 923 may face the first and second sound generating devices 1800 and 1800'. Therefore, since one or more pads are provided on at least one side of a partition and a shape of each of the pads is configured as a shape which configures to protrude toward a sound generating device, the wave phenomenon may more reduce or decrease, and the peak or the dipping caused by the standing wave may be more reduced, thereby more enhancing a sound output characteristic. Also, since the partition and the pads are formed of different materials, the wave phenomenon may reduce or decrease, and a desired sound may be output, thereby enhancing a sound output characteristic.

Figure 17A:
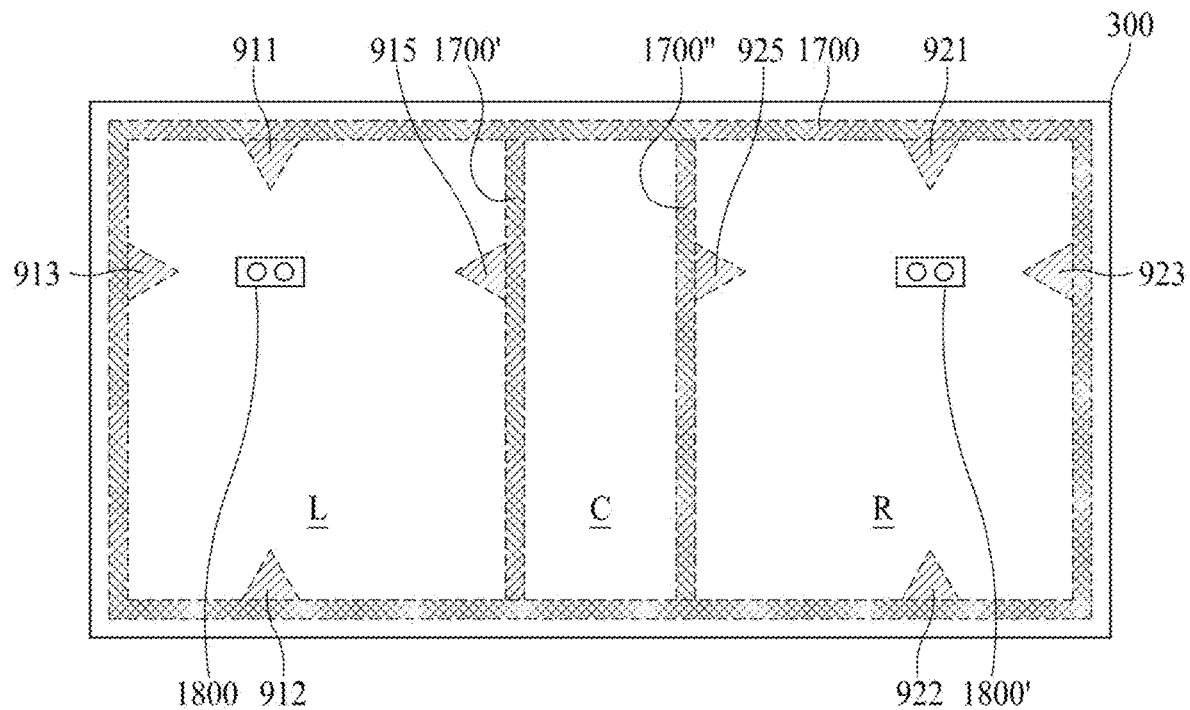
FIGS. 17A to 17C illustrate a sound generating device and a partition according to another embodiment of the present disclosure.
Figure 17B:
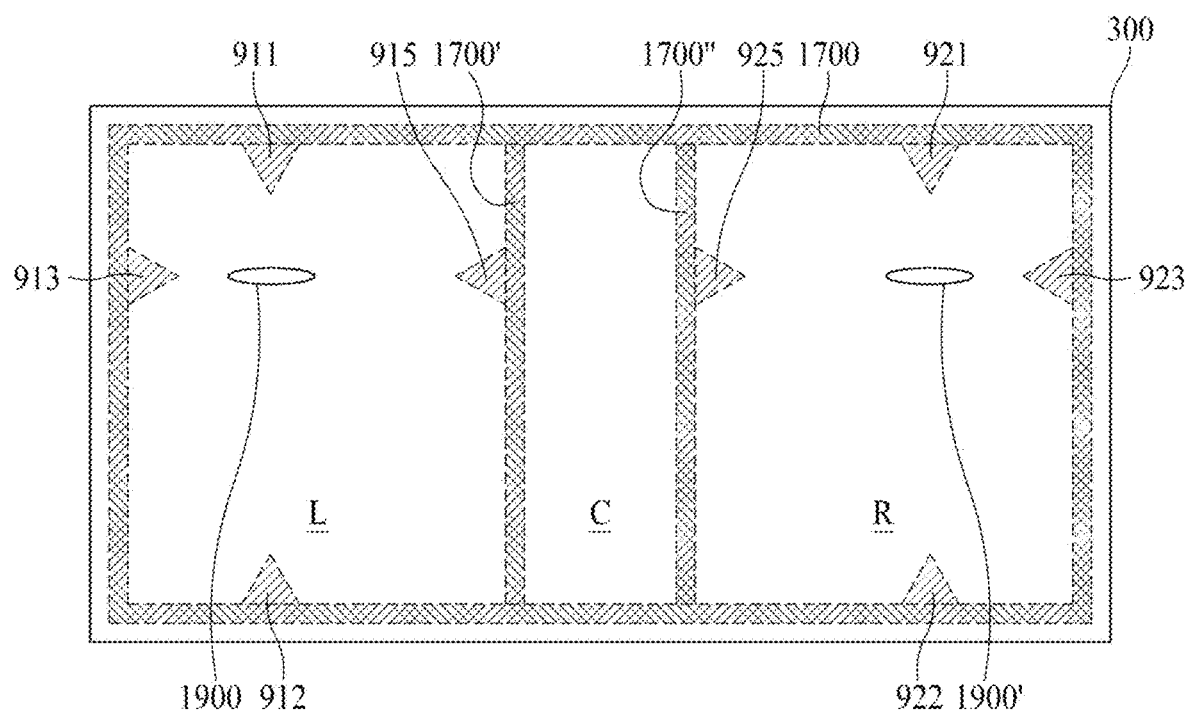
Figure 17C:
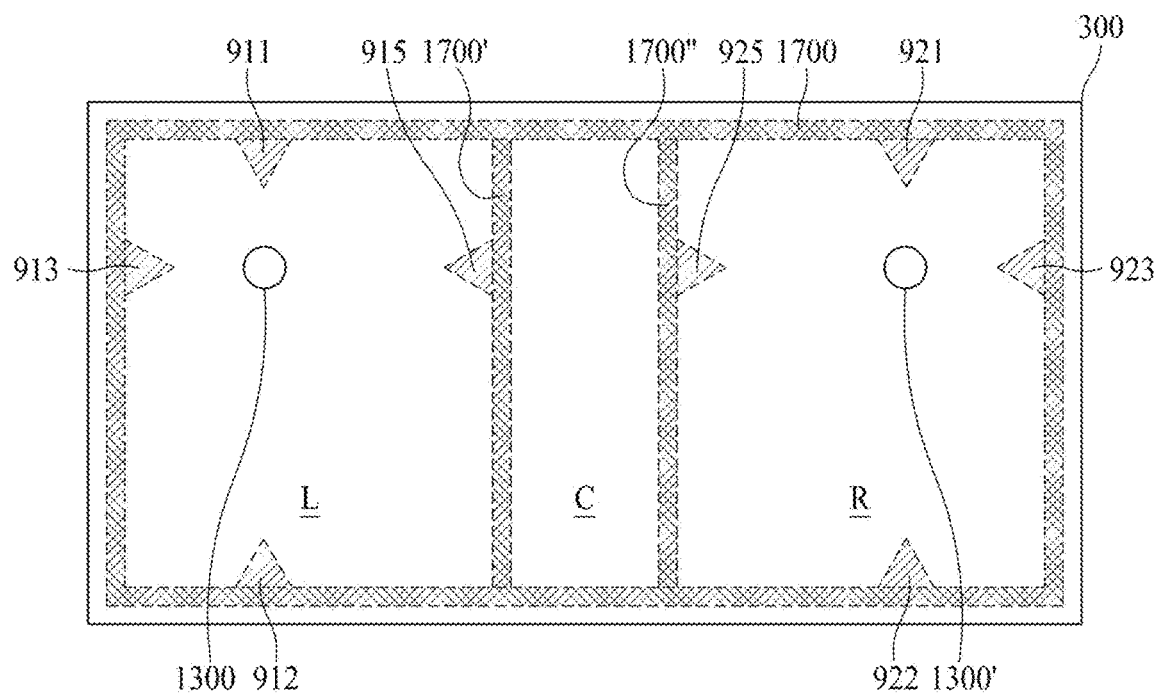

FIGS. 17A to 17C illustrate a sound generating device and a partition according to another embodiment of the present disclosure.

In FIGS. 17A to 17C, the same descriptions as descriptions given above with reference to FIGS. 13A to 16C are omitted or will be briefly given below. For example, description of a sound generating device is omitted or will be briefly given below. A partition and a pad will be described below with reference to FIG. 17A, and their descriptions may be identically applied to FIGS. 17B and 17C.

With reference to FIG. 17A, a first sound generating device 1800 and a second sound generating device 1800' may not be disposed in a center of a first region L or a second region R, and may be in an upper portion of a display panel 100 or an upper portion of a supporting member 300. Such a disposition may be changed based on a position of a rear cover on a rear surface of a display apparatus, and when a size of the rear cover is large, the first sound generating device 1800 and the second sound generating device 1800' may be disposed in the upper portion of the supporting member 300 so as to be covered. For example, first to third pads 911 to 913, a fifth pad 915, seventh to ninth pads 921 to 923, and an eleventh pad 925 may be in at least one side of each of a first partition 1700, a second partition 1700', and a third partition 1700''. Therefore, the fifth pad 915 and the eleventh pad 925 may be further provided, and thus, may more reduce a peak or dipping each caused by a standing wave which occurs due to interference between a reflected wave and a progressive wave and may better prevent sound quality from being degraded by the standing wave or the reflected wave. For example, the third pad 913 and the fifth pad 915 may be disposed to be symmetrical with the first sound generating device 1800, and the ninth pad 923 and the eleventh pad 925 may be disposed to be symmetrical with the second sound generating device 1800'. The first to third pads 911 to 913, the fifth pad 915, the seventh to ninth pads 921 to 923, and the eleventh pad 925 may be provided to face the first sound generating device 1800 and the second sound generating device 1800'. For example, corners or ends of a triangular shape or a corners-rounded triangular shape of each of the first to third pads 911 to 913, the fifth pad 915, the seventh to ninth pads 921 to 923, and the eleventh pad 925 may face the first and second sound generating devices 1800 and 1800'. Therefore, since one or more pads are on at least one side of a partition and a shape of each of the pads is configured as a shape which configures to protrude toward a sound generating device, the wave phenomenon may more reduce or decrease, and the peak or the dipping caused by the standing wave may be more reduced, thereby more enhancing a sound output characteristic. Also, since the partition and the pads are formed of different materials, the wave phenomenon may reduce or decrease, and a desired sound may be output, thereby enhancing a sound output characteristic.

Figure 18A:
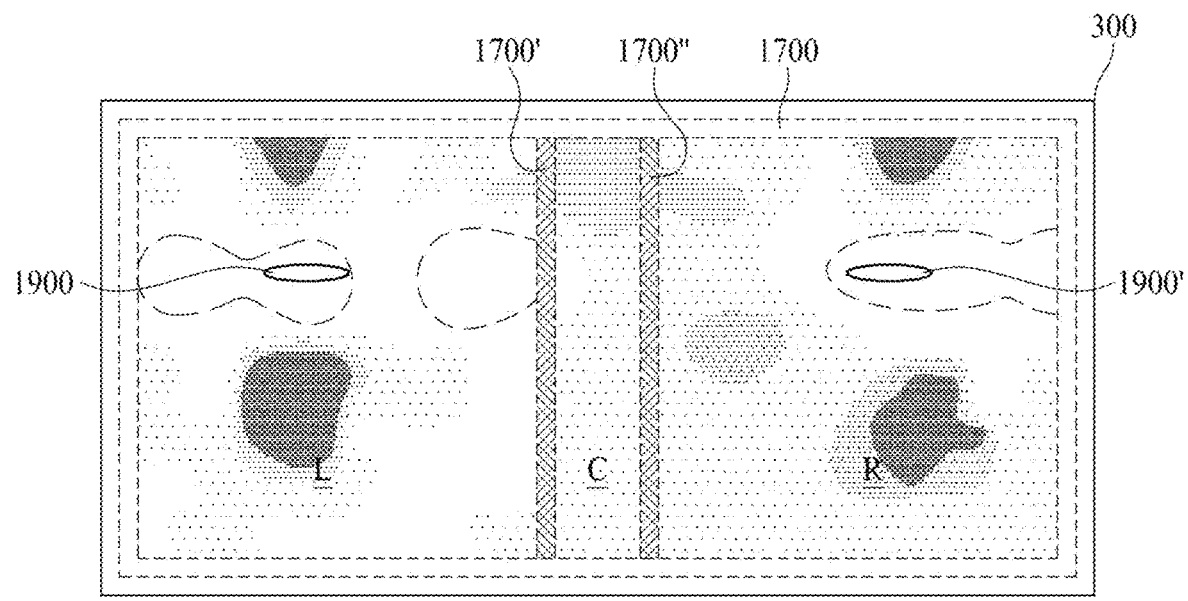
FIGS. 18A and 18B illustrate a vibration characteristic of a sound generating device according to an embodiment of the present disclosure.
Figure 18B:
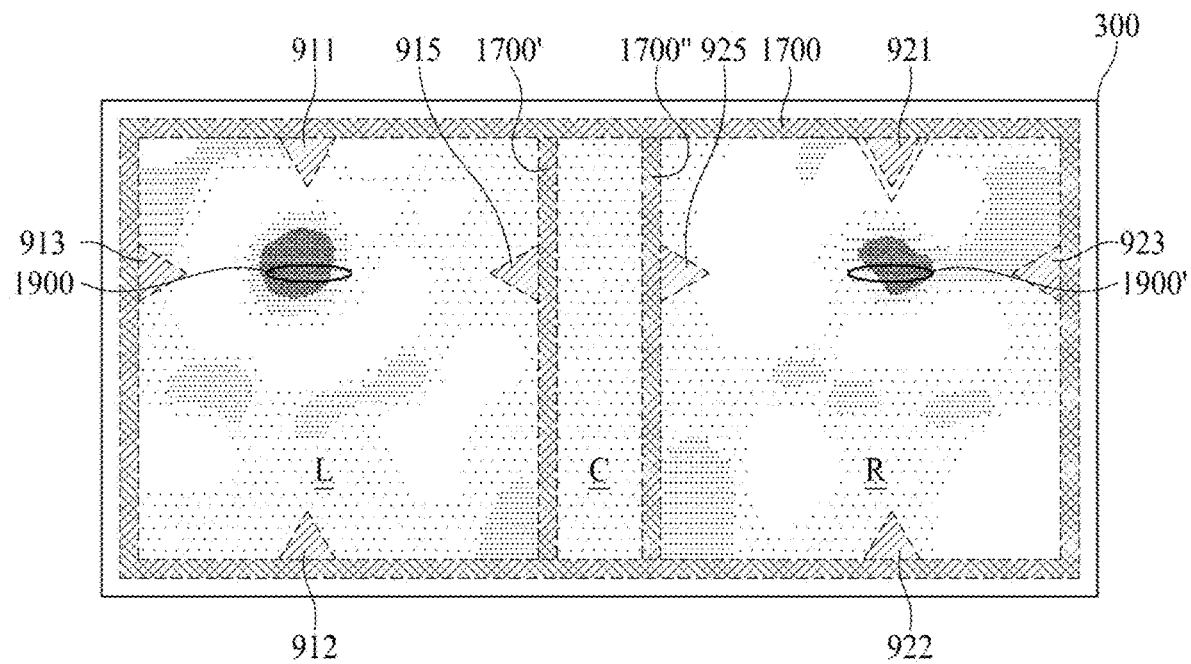

FIGS. 18A and 18B illustrate a vibration characteristic of a sound generating device according to an embodiment of the present disclosure.

FIGS. 18A and 18B show experimental results obtained by measuring a vibration characteristic by using a laser Doppler apparatus. The laser Doppler apparatus irradiates a laser beam onto a sound vibration surface of a display panel to scatter and spread a vibration, and a shape where the vibration spreads may be checked. Such a shape may be displayed as an image. A microphone through which a sound is input is disposed in a center of the display panel, and the vibration has been measured in a state which faces the center of the display panel.

FIG. 18A illustrates a vibration characteristic when a pad is not applied. FIG. 18B illustrates a vibration characteristic when a sound generating device according to an embodiment of the present disclosure of FIG. 17B is applied.

FIG. 18A shows an experimental result obtained through measurement when a partition is provided in a supporting member. FIG. 18B shows a result obtained through measurement when a partition and a pad are provided in a supporting member, and even when a partition and a pad are provided on a rear surface of the display panel, the same result may be obtained. Also, measurement has been performed when an elliptical sound generating device is applied, and even when a circular sound generating device or a pair of sound generating devices is applied, the same result may be obtained. Also, even when FIGS. 14A to 16C, 17A, and 17C, the same result may be obtained.

With reference to FIGS. 18A and 18B, a portion shown in black represents a portion where a vibration is large, and a blurred portion represents a portion where a vibration is small. For example, when each of a first sound generating device 1900 and a second sound generating device 1900' generates a vibration, the vibration spreads and is discharged to the outside while the portion shown in black is forming a concentric circle. When a larger vibration occurs subsequently, a color of each of a slightly blurred portion and a blurred portion is changed to black. Also, the slightly blurred portion is changed to a blurred portion where a vibration decreases over time.

With reference to FIG. 18A, it may be seen (a dotted line) that a vibration does not spread from the first sound generating device 1900 of a first region L and the second sound generating device 1900' of a second region R.

With reference to FIG. 18B, it may be seen that a vibration is shown in each of the first sound generating device 1900 of the first region L and the second sound generating device 1900' of the second region R. For example, it may be seen that a uniform vibration is shown in each of the first sound generating device 1900 of the first region L and the second sound generating device 1900' of the second region R. It may be seen that a vibration spreads circularly around first to third pads 911 to 913, a fifth pad 915, seventh to ninth pads 921 to 923, and an eleventh pad 925, and it may be seen that a standing wave is controlled by a pad. Accordingly, in comparison with FIG. 18A, it may be seen that a uniform vibration is shown in each of the first sound generating device 1900 of the first region L and the second sound generating device 1900' of the second region R by using the pad.

Figure 19:
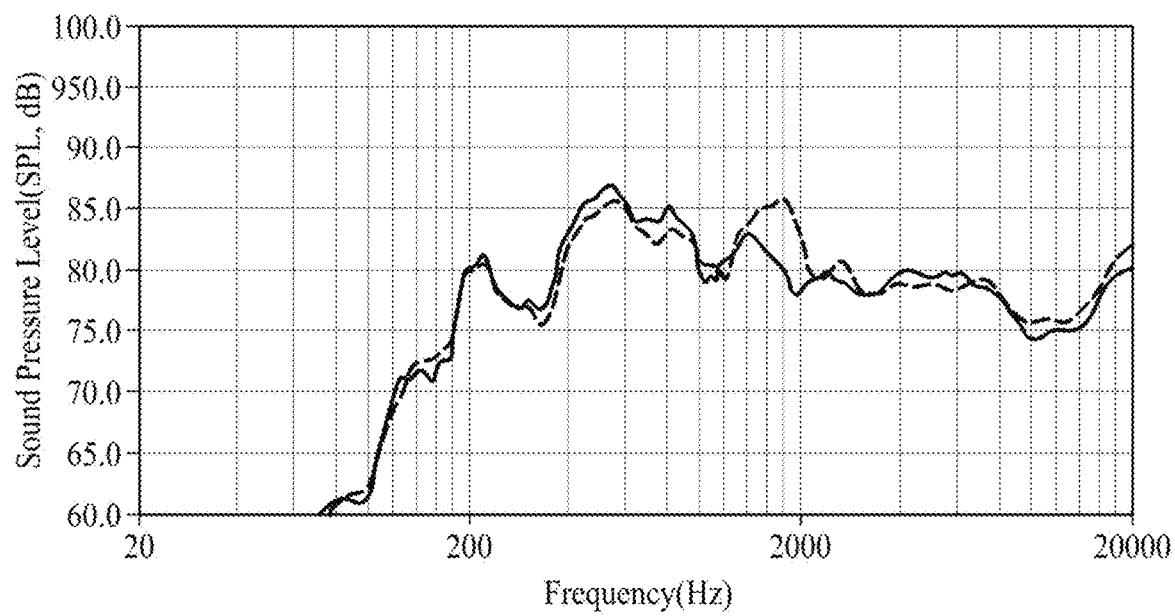
FIG. 19 illustrate a sound output characteristic of a sound generating device according to an embodiment of the present disclosure.

FIG. 19 illustrates a sound output characteristic of a sound generating device according to an embodiment of the present disclosure.

In FIG. 19, a dotted line represents a sound output characteristic of a sound generating device to which a pad is not applied, and a solid line represents a sound output characteristic of the sound generating device of FIG. 17B.

Also, the abscissa axis represents a frequency in hertz (Hz), and the ordinate axis represents a sound pressure level (SPL) in decibel (dB).

With reference to FIG. 19, in a dotted line, it may be seen that a peak appears in about 1.8 kHz. Also, in a solid line representing a case where the sound generating device of FIG. 17B is applied, it may be seen that a peak is reduced in about 1.8 kHz. The peak may denote a phenomenon where a sound pressure level bounces in a specific frequency. Flatness may denote a difference between a highest point and a lowest point of the sound pressure level in the specific frequency, and as the difference decreases, a sound characteristic may be good. Dipping may be a phenomenon where a low sound pressure level is generated by preventing the generating of the specific frequency. Therefore, in an embodiment of the present disclosure, it may be seen that, since a pad is provided in a partition, the number of peaks or dipping is reduced, and thus, flatness of a sound is improved. Accordingly, a display apparatus according to an embodiment of the present disclosure may output a sound having a sound characteristic where the peak or the dipping is reduced and the sound is flatter, thereby providing a display apparatus with enhanced sound output characteristic. Also, FIG. 17B has been described above as an example, but even when FIGS. 14A to 16C, 17A, and 17C are applied, the same result may be obtained.

A sound generating device according to an embodiment of the present disclosure may be applied as a sound generating device in a display apparatus. The display apparatus according to an embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, portable multimedia players (PMPs), personal digital assistants (PDAs), electronic organizers, desktop personal computers (PCs), laptop PCs, netbook computers, workstations, navigation apparatuses, automotive navigation apparatuses, automotive display apparatuses, TVs, wall paper display apparatuses, signage apparatuses, game machines, notebook computers, monitors, cameras, camcorders, home appliances, etc. Also, the sound generating device according to an embodiment of the present disclosure may be applied to organic light emitting lighting apparatuses or inorganic light emitting lighting apparatuses. When the sound generating device is applied to a lighting apparatus, the sound generating device may act as lighting and a speaker.

A display apparatus according to an embodiment of the present disclosure will be described below.

According to an embodiment of the present disclosure, a display apparatus includes a display panel configured to display an image, a supporting member on a rear surface of the display panel, the supporting member being configured to support the display panel, at least one sound generating device on the rear surface of the display panel, the at least one sound generating device being configured to vibrate the display panel to generate sound, a partition between the display panel and the supporting member, the partition including a first side and a second side vertical to the first side, a first pad in the first side, and a second pad in a side facing the first side, the second pad including a material differing from a material of the partition.

For example, in the display apparatus according to an embodiment of the present disclosure, the first pad may include the same material as a material of the second pad.

For example, in the display apparatus according to an embodiment of the present disclosure, the first pad may include the same material as a material of the partition.

For example, in the display apparatus according to an embodiment of the present disclosure, the first pad and the second pad may configured to have a shape to protrude toward the at least one sound generating device.

For example, in the display apparatus according to an embodiment of the present disclosure, the first pad and the second pad may have a triangular shape or a corners-rounded triangular shape, and an end of the triangular shape or an end of the corners-rounded triangular shape may face the at least one sound generating device.

For example, the display apparatus according to an embodiment of the present disclosure may further include at least one third pad or at least one fourth pad in the second side, the at least one third pad or the at least one fourth pad including the same material as a material of the second pad.

For example, the display apparatus according to an embodiment the present disclosure may further include at least one third pad or at least one fourth pad in the second side, the at least one third pad or the at least one fourth pad including the same material as a material of the partition.

For example, in the display apparatus according to an embodiment of the present disclosure, the at least one sound generating device may include one or more of a circular sound generating device, an oval sound generating device, and a pair of sound generating devices.

According to an embodiment of the present disclosure, a display apparatus includes a display panel configured to display an image and including a first region, a second region, and a third region, at least one sound generating device in at least one of the first region, the second region, and the third region on the rear surface of the display panel, a supporting member on a rear surface of the display panel, the supporting member being configured to support the display panel, a first partition between the display panel and the supporting member, the first partition including a first side and a second side vertical to the first side, at least one first pad in the first region, the at least one first pad being in the first side, and at least one second pad facing the first pad, the at least one second pad including a different material from a material of the first partition.

For example, in the display apparatus according to an embodiment of the present disclosure, the at least one first pad may include the same material as a material of the at least one second pad.

For example, in the display apparatus according to an embodiment of the present disclosure, the at least one first pad and the at least one second pad may have a triangular shape or a corners-rounded triangular shape, and an end of the triangular shape or an end of the corners-rounded triangular shape may face the at least one sound generating device.

For example, the display apparatus according to an embodiment of the present disclosure may further include at least one third pad or at least one fourth pad in the first region, the at least one third pad or the at least one fourth pad being in the second side, the at least one third pad or the at least one fourth pad including the same material as a material of the at least one second pad.

For example, in the display apparatus according to an embodiment of the present disclosure, the at least one third pad or the at least one fourth pad may have a triangular shape or a corners-rounded triangular shape, and an end of the triangular shape or an end of the corners-rounded triangular shape may face the at least one sound generating device.

For example, the display apparatus according to an embodiment of the present disclosure may further include at least one third pad or at least one fourth pad ed in the first region, the at least one third pad or the at least one fourth pad being in the second side, the at least one third pad or the at least one fourth pad including the same material as a material of the first partition.

For example, the display apparatus according to an embodiment of the present disclosure may further include at least one seventh pad in the second region, at least one seventh pad being in the second side and at least one eighth pad face the at least one seventh pad, wherein the at least one seventh pad and the at least one eighth pad may include the same material as a material of the at least one second pad.

For example, in the display apparatus according to an embodiment of the present disclosure, the at least one seventh pad and the at least one eighth pad may have a triangular shape or a corners-rounded triangular shape, and an end of the triangular shape or an end of the corners-rounded triangular shape may face the at least one sound generating device.

For example, in the display apparatus according to an embodiment of the present disclosure, the at least one seventh pad may include the same material as a material of the first partition.

For example, the display apparatus according to an embodiment of the present disclosure may further include at least one ninth pad or at least one tenth pad in the second region, the at least one ninth pad or the at least one tenth pad being in the second side, the at least one ninth pad or the at least one tenth pad including the same material as a material of the at least one second pad.

For example, in the display apparatus according to an embodiment of the present disclosure, the at least one ninth pad or the at least one tenth pad may have a triangular shape or a corners-rounded triangular shape, and an end of the triangular shape or an end of the corners-rounded triangular shape may face the at least one sound generating device.

For example, the display apparatus according to an embodiment of the present disclosure may further include at least one ninth pad or at least one tenth pad in the second region, the at least one ninth pad or the at least one tenth pad being in the second side, the at least one ninth pad or the at least one tenth pad including the same material as a material of the first partition.

For example, in the display apparatus according to an embodiment of the present disclosure, the first region may be a left region of the display panel, the second region may be a right region of the display panel, the third region may be a central region of the display panel, and the display apparatus may further include a second partition between the first region and the third region and a third partition between the second region and the third region.

For example, in the display apparatus according to an embodiment of the present disclosure, at least one of the second partition and the third partition may include a material differing from a material of the at least one second pad.

For example, in the display apparatus according to an embodiment of the present disclosure, at least one of the second partition and the third partition may include the same material as a material of the first partition.

For example, the display apparatus according to an embodiment of the present disclosure may further include at least one fifth pad or at least one sixth pad in the first region, the at least one fifth pad or the at least one sixth pad being in a side of the second partition facing the second side, the at least one fifth pad or the at least one sixth pad including the same material as a material of the at least one second pad.

For example, in the display apparatus according to an embodiment of the present disclosure, the at least one fifth pad or the at least one sixth pad may have a triangular shape or a corners-rounded triangular shape, and an end of the triangular shape or an end of the corners-rounded triangular shape face the at least one sound generating device.

For example, the display apparatus according to an embodiment of the present disclosure may further include at least one eleventh pad or at least one twelfth pad in the second region, the at least one eleventh pad or the at least one twelfth pad being in a side of the third partition facing the second side, the at least one eleventh pad or the at least one twelfth pad including the same material as a material of the at least one second pad.

For example, in the display apparatus according to an embodiment of the present disclosure, the at least one eleventh pad or the at least one twelfth pad may have a triangular shape or a corners-rounded triangular shape, and an end of the triangular shape or an end of the corners-rounded triangular shape may face the at least one sound generating device.

For example, in the display apparatus according to an embodiment of the present disclosure, the first partition may be configured based on a shape of the display panel.

For example, in the display apparatus according to an embodiment of the present disclosure, an area of the third region may be less than each of an area of the first region and an area of the second region.

For example, in the display apparatus according to an embodiment of the present disclosure, the first partition may be formed of the double-sided tape or a double-sided foam pad including a foam material.

For example, in the display apparatus according to an embodiment of the present disclosure, the at least one sound generating device may be fixed to the supporting member by a screw and a nut.

For example, the display apparatus according to an embodiment of the present disclosure may further include a second supporting member on the supporting member for the nut to be accommodated.

It will be apparent to those skilled in the art that various modifications and variations may be made in the display apparatus of the present disclosure without departing from the technical idea or scope of the disclosure. Thus, it is intended that embodiments of the present disclosure cover the modifications and variations of the disclosure provided they come within the scope of the appended claims and their equivalents.

What is claimed is:
1. A display apparatus, comprising:
 a display panel configured to display an image;
 a supporting member on a rear surface of the display panel, the supporting member being configured to support the display panel;
 at least one sound generating device on the rear surface of the display panel, the at least one sound generating device being configured to vibrate the display panel to generate sound;
 a partition between the display panel and the supporting member, the partition including a first side and a second side vertical to the first side;

a first pad in the first side;
a second pad in a side facing the first side; and
a third pad in the second side, the third pad including a same material as a material of the second pad,
wherein the first pad and the second pad include a material differing from a material of the partition,
wherein the partition has a same edge contour shape as the display panel, and
wherein an end of the first pad and an end of the second pad are disposed toward the at least one sound generating device.

2. The display apparatus of claim 1, wherein the first pad and the second pad are configured to have a shape to protrude toward the at least one sound generating device.

3. The display apparatus of claim 1, wherein:
the first pad and the second pad has a triangular shape or a corners-rounded triangular shape; and
an end of the triangular shape or an end of the corners-rounded triangular shape faces the at least one sound generating device.

4. The display apparatus of claim 1, further comprising a fourth pad in the second side, the fourth pad including the same material as the material of the second pad.

5. The display apparatus of claim 1, wherein the at least one sound generating device comprises one or more of a circular sound generating device, an oval sound generating device, and a pair of sound generating devices.

6. A display apparatus, comprising:
a display panel configured to display an image, the display panel including:
a first region;
a second region; and
a third region;
at least one sound generating device in at least one of: the first region, the second region, and the third region on the rear surface of the display panel;
a supporting member on a rear surface of the display panel, the supporting member being configured to support the display panel;
a first partition between the display panel and the supporting member, the first partition including a first side and a second side vertical to the first side;
at least one first pad in the first region, and the at least one first pad being in the first side;
at least one second pad facing the first pad; and
the at least one third pad in the second side, the at least one third pad including a same material as a material of the at least one second pad,
wherein the at least one first pad and the at least one second pad include a different material from a material of the first partition,
wherein the partition has a same edge contour shape as the display panel, and
wherein an end of at least one first pad and an end of at least one second pad are disposed toward the at least one sound generating device.

7. The display apparatus of claim 6, wherein:
the at least one first pad and the at least one second pad has a triangular shape or a corners-rounded triangular shape; and
an end of the triangular shape or an end of the corners-rounded triangular shape faces the at least one sound generating device.

8. The display apparatus of claim 6, further comprising at least one fourth pad in the first region, the at least one fourth pad being in the second side, the at least one fourth pad including the same material as the material of the at least one second pad.

9. The display apparatus of claim 8, wherein:
the at least one third pad or the at least one fourth pad has a triangular shape or a corners-rounded triangular shape; and
an end of the triangular shape or an end of the corners-rounded triangular shape faces the at least one sound generating device.

10. The display apparatus of claim 6, further comprising:
at least one seventh pad in the second region, and the at least one seventh pad being in the second side; and
at least one eighth pad facing the at least one seventh pad,
wherein the at least one seventh pad and the at least one eighth pad comprise the same material as the material of the at least one second pad.

11. The display apparatus of claim 10, wherein:
the at least one seventh pad and the at least one eighth pad has a triangular shape or a corners-rounded triangular shape; and
an end of the triangular shape or an end of the corners-rounded triangular shape faces the at least one sound generating device.

12. The display apparatus of claim 6, further comprising at least one ninth pad or at least one tenth pad in the second region, the at least one ninth pad or the at least one tenth pad being in the second side, and the at least one ninth pad or the at least one tenth pad including the same material as the material of the at least one second pad.

13. The display apparatus of claim 12, wherein:
the at least one ninth pad or the at least one tenth pad has a triangular shape or a corners-rounded triangular shape; and
an end of the triangular shape or an end of the corners-rounded triangular shape faces the at least one sound generating device.

14. The display apparatus of claim 6, wherein:
the first region is a left region of the display panel;
the second region is a right region of the display panel;
the third region is a central region of the display panel; and
the display apparatus further comprises:
a second partition between the first region and the third region; and
a third partition between the second region and the third region.

15. The display apparatus of claim 14, wherein at least one of the second partition and the third partition comprises a material differing from the material of the at least one second pad.

16. The display apparatus of claim 14, further comprising:
at least one fifth pad or at least one sixth pad in the first region,
wherein the at least one fifth pad or the at least one sixth pad is in a side of the second partition facing the second side, and
wherein the at least one fifth pad or the at least one sixth pad includes the same material as the material of the at least one second pad.

17. The display apparatus of claim 16, wherein:
the at least one fifth pad or the at least one sixth pad has a triangular shape or a corners-rounded triangular shape; and
an end of the triangular shape or an end of the corners-rounded triangular shape faces the at least one sound generating device.

18. The display apparatus of claim 14, further comprising:
at least one eleventh pad or at least one twelfth pad in the second region,
wherein the at least one eleventh pad or the at least one twelfth pad is in a side of the third partition facing the second side, and
wherein the at least one eleventh pad or the at least one twelfth pad includes the same material as the material of the at least one second pad.

19. The display apparatus of claim 18, wherein:
the at least one eleventh pad or the at least one twelfth pad has a triangular shape or a corners-rounded triangular shape; and
an end of the triangular shape or an end of the corners-rounded triangular shape faces the at least one sound generating device.

20. The display apparatus of claim 6, wherein the first partition is configured based on a shape of the display panel.

* * * * *